United States Patent
Hata et al.

(10) Patent No.: US 9,129,188 B2
(45) Date of Patent: Sep. 8, 2015

(54) IMAGE PROCESSING APPARATUS AND CONTROL METHOD THEREOF

(71) Applicant: CANON KABUSHIKI KAISHA, Tokyo (JP)

(72) Inventors: Tetsuya Hata, Kawasaki (JP); Kotaro Kitajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 13/922,552

(22) Filed: Jun. 20, 2013

(65) Prior Publication Data

US 2013/0343646 A1    Dec. 26, 2013

(30) Foreign Application Priority Data

Jun. 22, 2012 (JP) ................ 2012-141463
Jun. 25, 2012 (JP) ................ 2012-142476
Jun. 25, 2012 (JP) ................ 2012-142477

(51) Int. Cl.
*G06K 9/32* (2006.01)
*G06K 9/46* (2006.01)
*G06T 7/40* (2006.01)

(52) U.S. Cl.
CPC ............ *G06K 9/4652* (2013.01); *G06K 9/4642* (2013.01); *G06K 9/4661* (2013.01); *G06T 7/408* (2013.01); *G06T 2207/10024* (2013.01)

(58) Field of Classification Search
CPC . G06K 9/4652; G06K 9/4642; G06K 9/4661; G06T 5/40; G06T 7/408; G06T 2207/10024
USPC .................................................. 382/165, 168
See application file for complete search history.

(56) References Cited

U.S. PATENT DOCUMENTS

| | | | |
|---|---|---|---|
| 7,436,997 B2 * | 10/2008 | Ishigami et al. ............... | 382/167 |
| 7,869,019 B2 * | 1/2011 | Ono .............................. | 356/213 |
| 8,200,007 B2 * | 6/2012 | Finlayson et al. ............ | 382/167 |

FOREIGN PATENT DOCUMENTS

| | | |
|---|---|---|
| JP | 2007-013415 A | 1/2007 |
| JP | 4447520 B | 4/2010 |

* cited by examiner

*Primary Examiner* — Kanjibhai Patel
(74) *Attorney, Agent, or Firm* — Carter, DeLuca, Farrell & Schmidt, LLP

(57) ABSTRACT

An image processing apparatus, which correctly extracts specular reflected light components of reflected light from an object, and accurately estimates a light source color, is provided. The image processing apparatus calculates a pixel value difference distribution by repeating, for respective pixels, to calculate pixel value differences between a pixel of interest and adjacent pixels in an input image and to calculate similarities between pixel value differences. A light source estimation unit estimates a color of a light source which illuminates an object in the input image based on the calculated distribution.

12 Claims, 29 Drawing Sheets

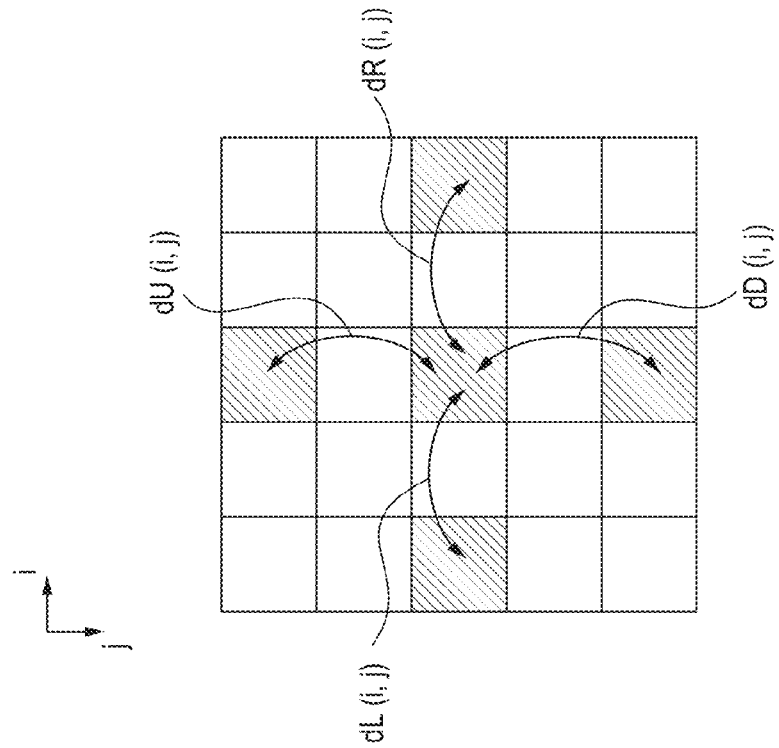
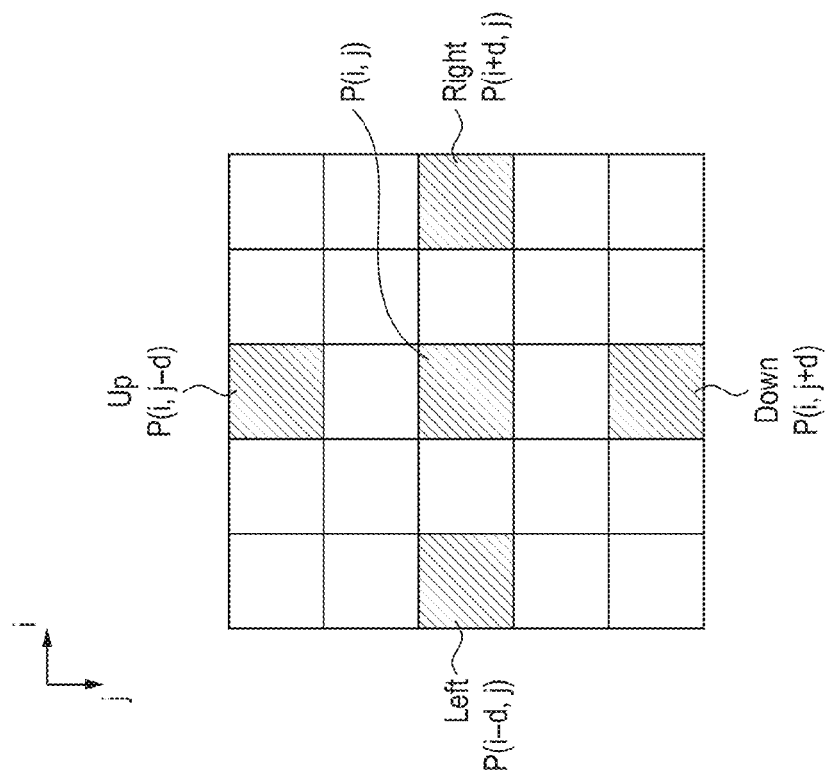

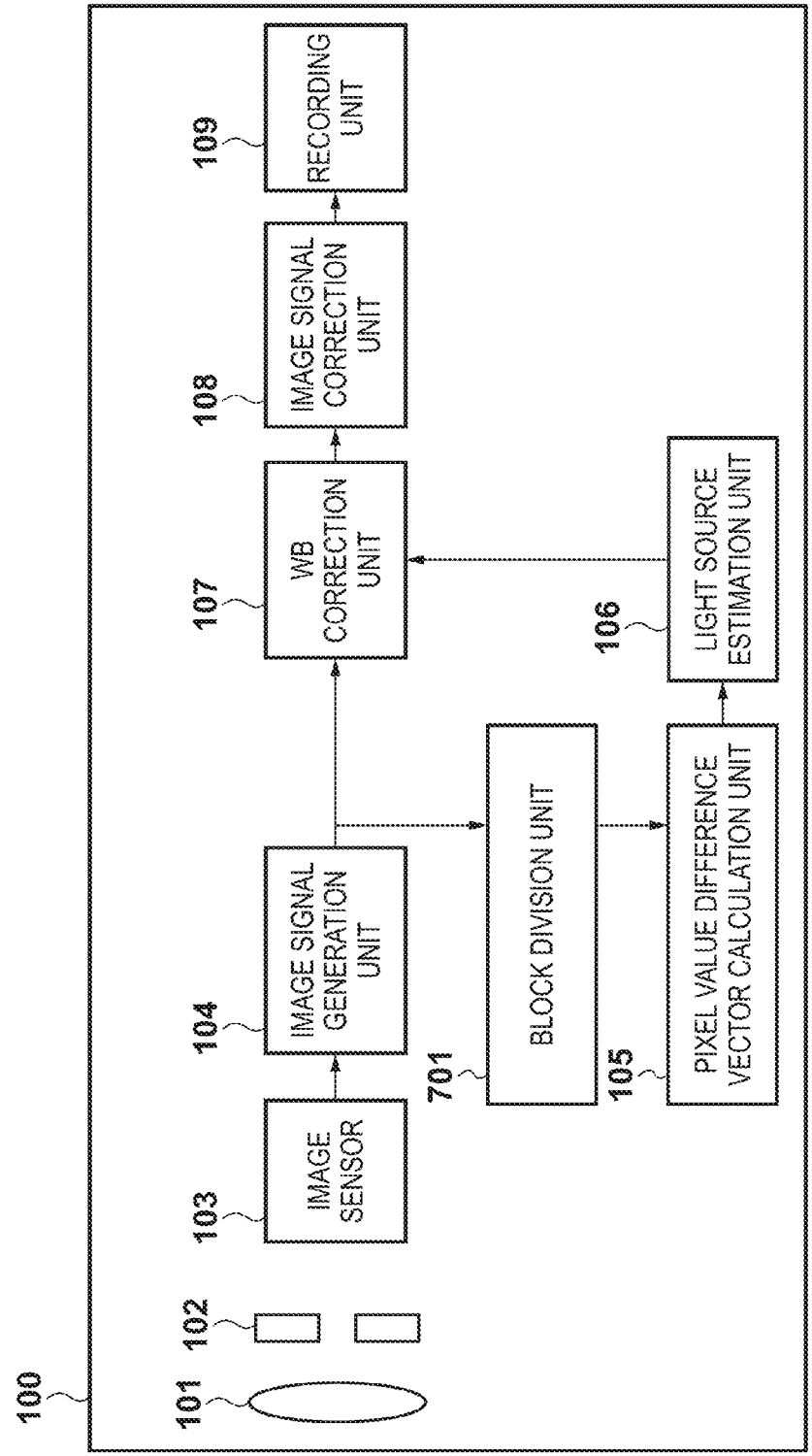

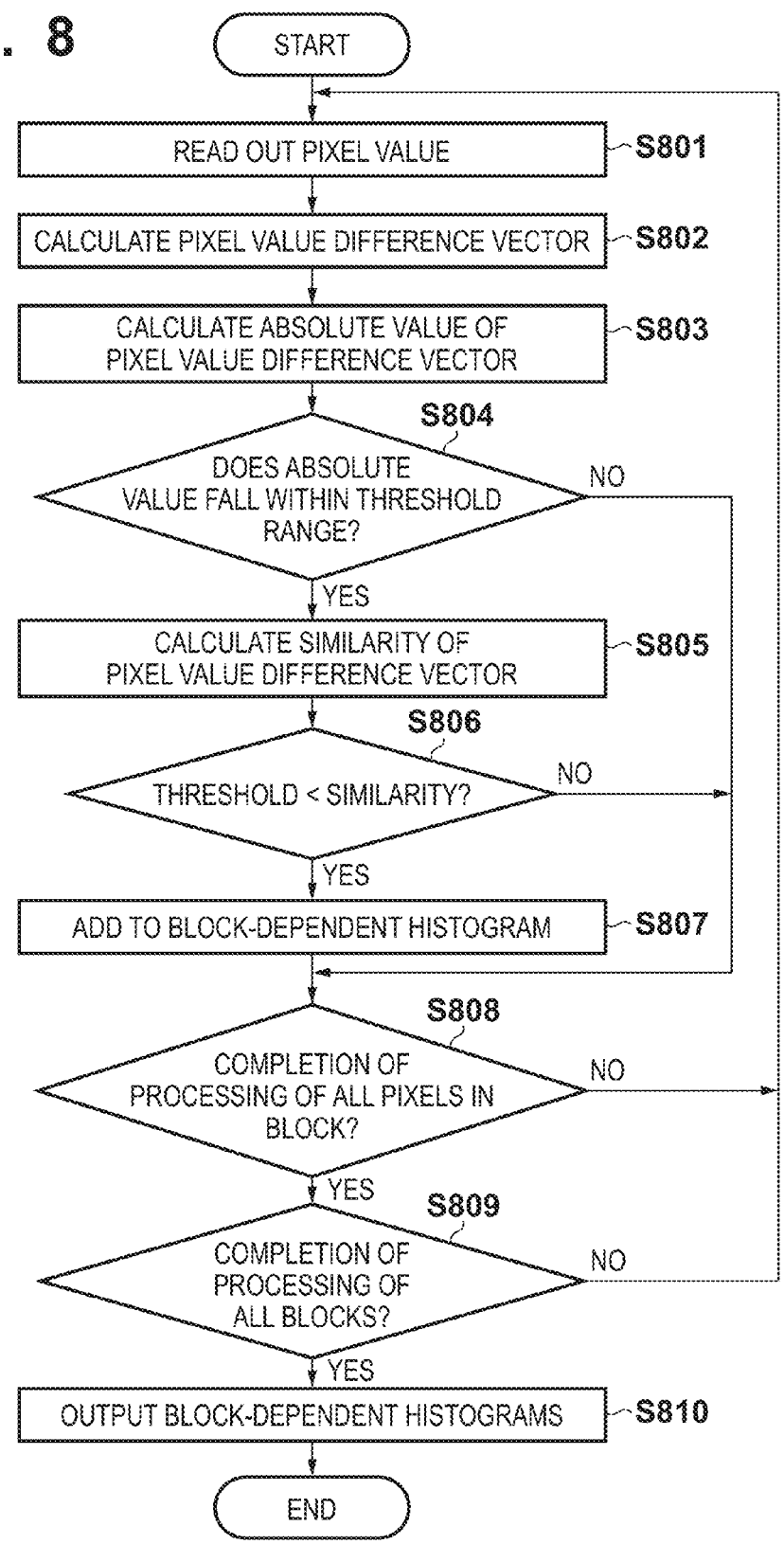

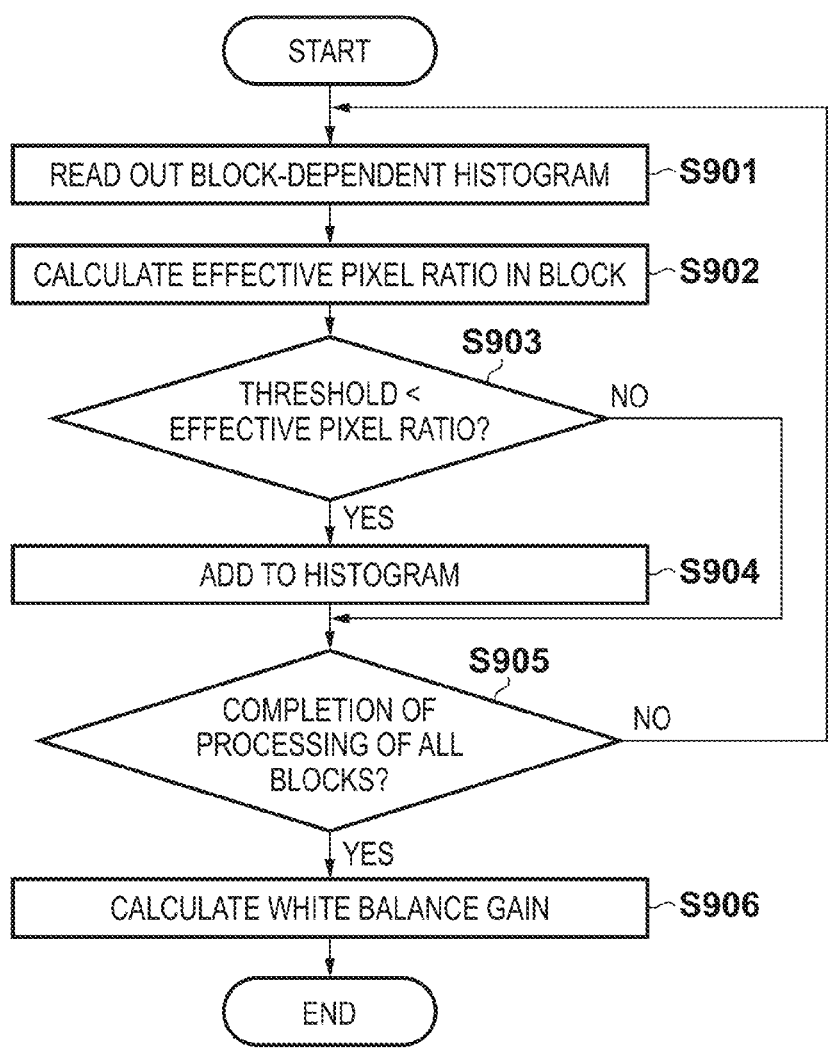
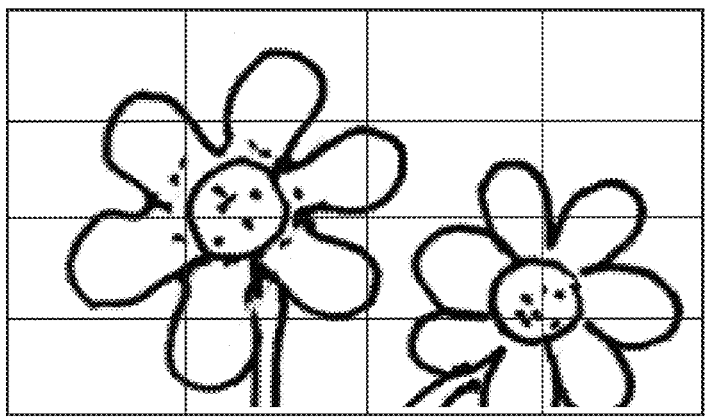

F I G. 13
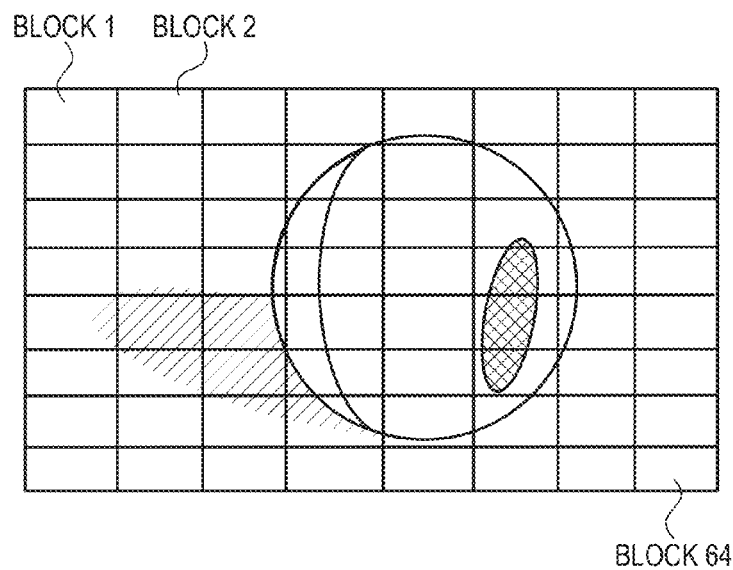
F I G. 14
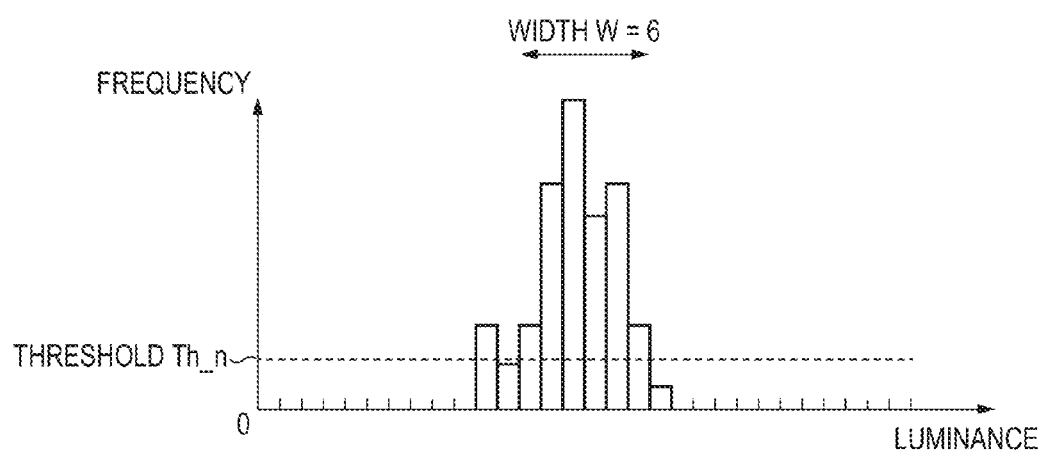

FIG. 16A

| f(i−1, j−1) | f(i, j−1) | f(i+1, j−1) |
|---|---|---|
| f(i−1, j) | f(i, j) | f(i+1, j) |
| f(i−1, j+1) | f(i, j+1) | f(i+1, j+1) |

INPUT IMAGE

FIG. 16B

| a(−1, −1) | a(0, −1) | a(1, −1) |
|---|---|---|
| a(−1, 0) | a(0, 0) | a(1, 0) |
| a(−1, 1) | a(0, 1) | a(1, 1) |

FILTER

FIG. 16C

| 1 | 2 | 1 |
|---|---|---|
| 0 | 0 | 0 |
| −1 | −2 | −1 |

FIG. 16D

| −1 | 0 | 1 |
|---|---|---|
| −2 | 0 | 2 |
| −1 | 0 | 1 |

FIG. 16E

| 0 | 1 | 2 |
|---|---|---|
| −1 | 0 | 1 |
| −2 | −1 | 0 |

FIG. 16F

| −2 | −1 | 0 |
|---|---|---|
| −1 | 0 | 1 |
| 0 | 1 | 2 |

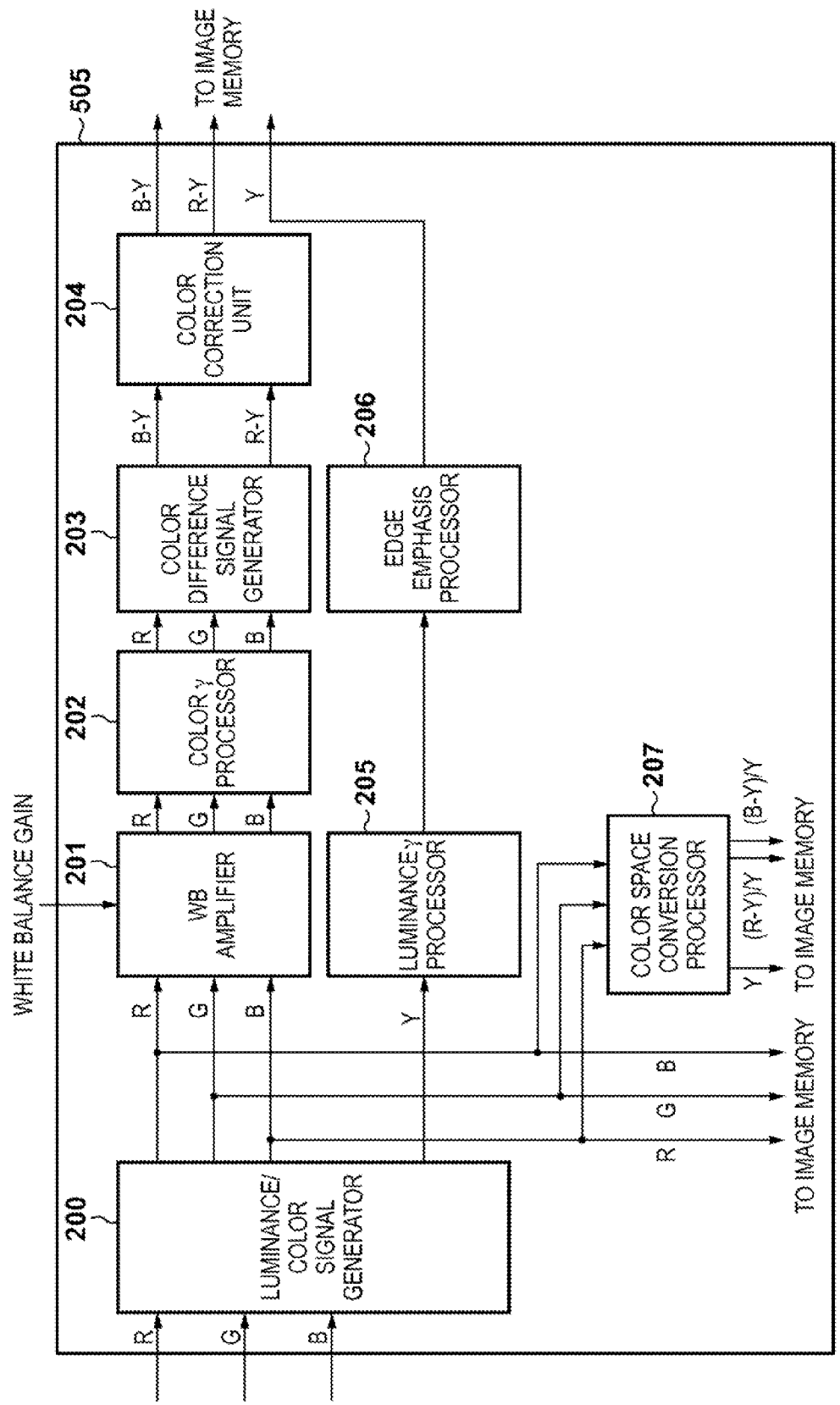

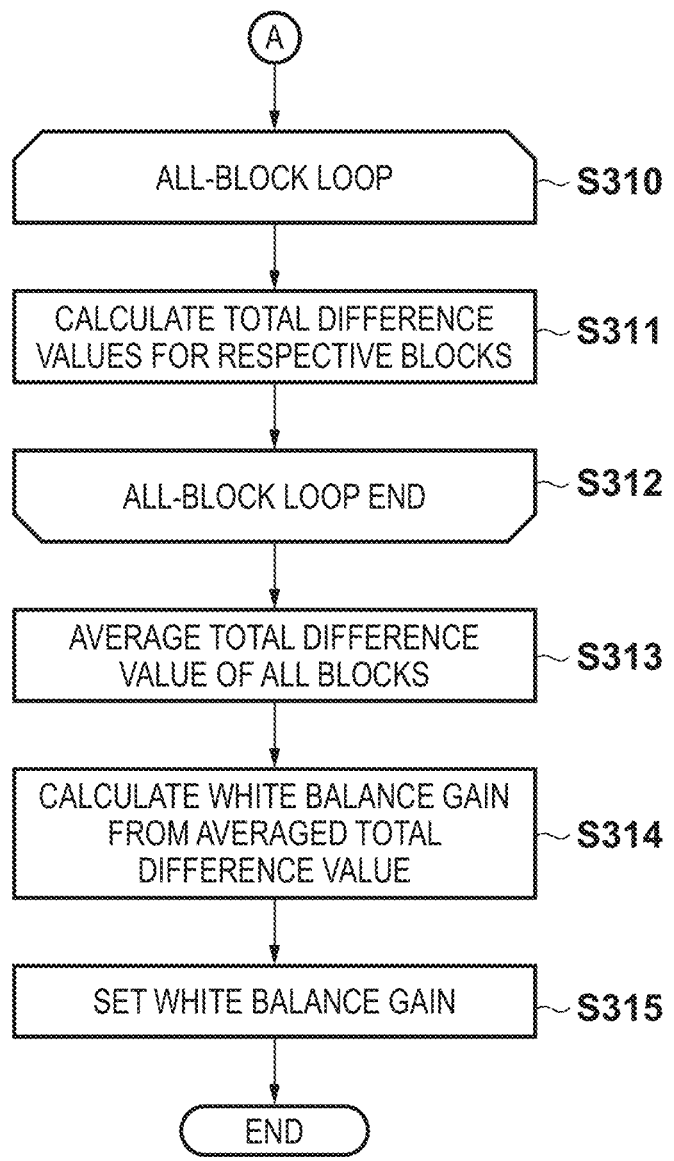
F I G. 24B

F I G. 27

| BLOCK 1 | | COLOR GROUP 1 | COLOR GROUP 2 | COLOR GROUP 3 | COLOR GROUP 4 | COLOR GROUP 5 | COLOR GROUP 6 |
|---|---|---|---|---|---|---|---|
| | DIFFERENCE TOTAL VALUE | R=XXX G=XXX B=XXX | R=XXX G=XXX B=XXX | R=XXX G=XXX B=XXX | R=XXX G=XXX B=XXX | R=XXX G=XXX B=XXX | R=XXX G=XXX B=XXX |
| | COUNT VALUE | 2312 | 981 | 53 | 387 | 0 | 17 |

| BLOCK 2 | | COLOR GROUP 1 | COLOR GROUP 2 | COLOR GROUP 3 | COLOR GROUP 4 | COLOR GROUP 5 | COLOR GROUP 6 |
|---|---|---|---|---|---|---|---|
| | DIFFERENCE TOTAL VALUE | R=XXX G=XXX B=XXX | R=XXX G=XXX B=XXX | R=XXX G=XXX B=XXX | R=XXX G=XXX B=XXX | R=XXX G=XXX B=XXX | R=XXX G=XXX B=XXX |
| | COUNT VALUE | 1002 | 101 | 356 | 2045 | 0 | 0 |

...

| BLOCK 16 | | COLOR GROUP 1 | COLOR GROUP 2 | COLOR GROUP 3 | COLOR GROUP 4 | COLOR GROUP 5 | COLOR GROUP 6 |
|---|---|---|---|---|---|---|---|
| | DIFFERENCE TOTAL VALUE | R=XXX G=XXX B=XXX | R=XXX G=XXX B=XXX | R=XXX G=XXX B=XXX | R=XXX G=XXX B=XXX | R=XXX G=XXX B=XXX | R=XXX G=XXX B=XXX |
| | COUNT VALUE | 293 | 657 | 53 | 387 | 204 | 320 |

FIG. 30

BLOCK 1

| | COLOR GROUP 1 | | COLOR GROUP 2 | | COLOR GROUP 3 | | | COLOR GROUP 6 | |
|---|---|---|---|---|---|---|---|---|---|
| | TOTAL VALUE | COUNT VALUE | TOTAL VALUE | COUNT VALUE | TOTAL VALUE | COUNT VALUE | | TOTAL VALUE | COUNT VALUE |
| LUMINANCE GROUP 1 (Y>235) | R=XXX G=XXX B=XXX | 2312 | R=XXX G=XXX B=XXX | 1392 | R=XXX G=XXX B=XXX | 13 | ... | R=XXX G=XXX B=XXX | 0 |
| LUMINANCE GROUP 2 (235≥Y>200) | R=XXX G=XXX B=XXX | 172 | R=XXX G=XXX B=XXX | 2589 | R=XXX G=XXX B=XXX | 24 | | R=XXX G=XXX B=XXX | 8 |
| LUMINANCE GROUP 3 (200≥Y>150) | R=XXX G=XXX B=XXX | 1981 | R=XXX G=XXX B=XXX | 78 | R=XXX G=XXX B=XXX | 267 | | R=XXX G=XXX B=XXX | 5 |
| LUMINANCE GROUP 4 (150≥Y>100) | R=XXX G=XXX B=XXX | 163 | R=XXX G=XXX B=XXX | 21 | R=XXX G=XXX B=XXX | 22 | | R=XXX G=XXX B=XXX | 28 |
| LUMINANCE GROUP 5 (100≥Y) | R=XXX G=XXX B=XXX | 0 | R=XXX G=XXX B=XXX | 80 | R=XXX G=XXX B=XXX | 17 | | R=XXX G=XXX B=XXX | 0 |

⋮

BLOCK 16

| | COLOR GROUP 1 | | COLOR GROUP 2 | | COLOR GROUP 3 | | | COLOR GROUP 6 | |
|---|---|---|---|---|---|---|---|---|---|
| | TOTAL VALUE | COUNT VALUE | TOTAL VALUE | COUNT VALUE | TOTAL VALUE | COUNT VALUE | | TOTAL VALUE | COUNT VALUE |
| LUMINANCE GROUP 1 (Y>235) | R=XXX G=XXX B=XXX | 0 | R=XXX G=XXX B=XXX | 35 | R=XXX G=XXX B=XXX | 5 | ... | R=XXX G=XXX B=XXX | 28 |
| LUMINANCE GROUP 2 (235≥Y>200) | R=XXX G=XXX B=XXX | 23 | R=XXX G=XXX B=XXX | 2923 | R=XXX G=XXX B=XXX | 25 | | R=XXX G=XXX B=XXX | 58 |
| LUMINANCE GROUP 3 (200≥Y>150) | R=XXX G=XXX B=XXX | 11 | R=XXX G=XXX B=XXX | 247 | R=XXX G=XXX B=XXX | 37 | | R=XXX G=XXX B=XXX | 79 |
| LUMINANCE GROUP 4 (150≥Y>100) | R=XXX G=XXX B=XXX | 38 | R=XXX G=XXX B=XXX | 465 | R=XXX G=XXX B=XXX | 77 | | R=XXX G=XXX B=XXX | 53 |
| LUMINANCE GROUP 5 (100≥Y) | R=XXX G=XXX B=XXX | 341 | R=XXX G=XXX B=XXX | 19 | R=XXX G=XXX B=XXX | 49 | | R=XXX G=XXX B=XXX | 39 |

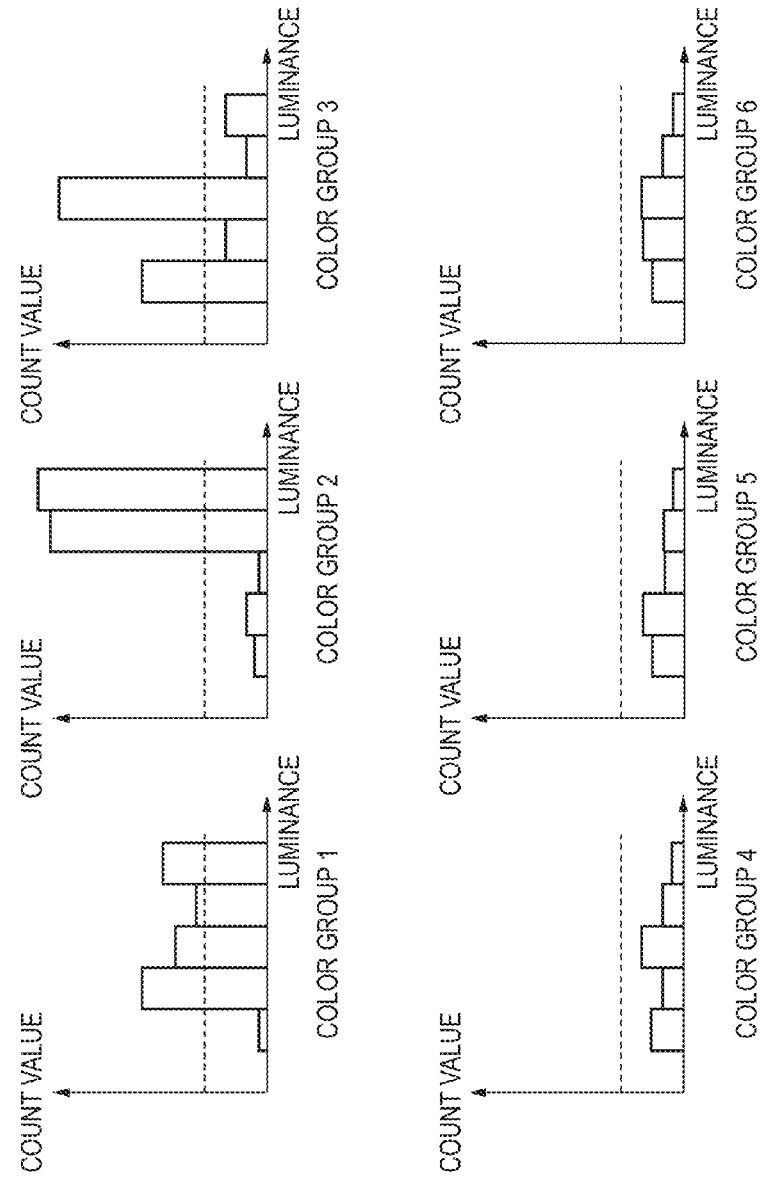

IMAGE PROCESSING APPARATUS AND CONTROL METHOD THEREOF

BACKGROUND OF THE INVENTION

1. Field of the Invention

The present invention relates to an image processing technique required to execute light source estimation processing for estimating a color of a light source which illuminates an object in an input image.

2. Description of the Related Art

Conventionally, an image processing apparatus which executes light source estimation processing based on a dichromatic reflection model is known. Note that the dichromatic reflection model is a model which is designed so that reflected light from an object includes irregularly reflected light components depending on an object color and specular reflected light components depending on a light source color.

For example, Japanese Patent Laid-Open No. 2007-013415 discloses an image processing apparatus, which estimates a light source color by calculating a difference between pixel values at two points A and B which are located at adjacent positions in an input image and have a luminance difference, so as to extract only specular reflection components from reflected light from an object.

The light source estimation method disclosed in Japanese Patent Laid-Open No. 2007-013415 calculates a difference between pixel values under the assumption that adjacent pixels belong to the same object. However, with this method, at a boundary region of objects in an input image, a difference between pixel values of pixels which belong to different objects may be unwantedly calculated. Pixel value differences of pixels which belong to the same object represent specular reflection components corresponding to a light source color, but a difference calculated between objects having different colors depends on a difference between object colors and does not correspond to any light source color. In such case, the conventional method cannot accurately estimate a light source color.

SUMMARY OF THE INVENTION

The present invention provides an image processing apparatus which can correctly extract specular reflection components of reflected light from an object, and can accurately estimate a light source color.

According to one aspect of the present invention, an image processing apparatus comprises a first calculation unit configured to calculate pixel value differences between a pixel of interest and a plurality of adjacent pixels in an input image for each of pixels in the input image, a second calculation unit configured to calculate similarities between the pixel value differences calculated for the pixel of interest in the input image for each of the pixels in the input image, a third calculation unit configured to calculate a distribution of the pixel value differences based on the calculated similarities, and an estimation unit configured to estimate a color of a light source which illuminates an object in the input image based on the calculated distribution.

Further features of the present invention will become apparent from the following description of exemplary embodiments (with reference to the attached drawings).

BRIEF DESCRIPTION OF THE DRAWINGS

FIGS. 3A and 3B are views for explaining the pixel value difference calculation processing;

FIG. 7 is a block diagram showing the arrangement of an image capturing apparatus according to the third embodiment;

FIG. 8 is a flowchart showing pixel value difference calculation processing according to the third embodiment;

FIG. 9 is a flowchart showing light source estimation processing according to the third embodiment;

FIG. 10 is a view showing an example of blocks obtained by dividing an input image;

FIG. 13 is a view showing an example of blocks obtained by dividing an input image;

FIG. 14 is a graph showing an example of a luminance histogram;

FIGS. 16A to 16F are views showing an example of contour extraction filters according to the fifth embodiment;

FIG. 23 is a block diagram showing an example of the arrangement of an image processing unit shown in FIG. 22;

FIGS. 24A and 24B are flowcharts for explaining light source color estimation processing according to the seventh embodiment;

FIG. 27 includes tables showing a storage method of differences and count values according to the seventh embodiment;

FIG. 30 includes tables showing a storage method of total values and count values according to the eighth embodiment; and FIG. 31 includes graphs showing an example of luminance distributions for respective color groups according to the eighth embodiment.

DESCRIPTION OF THE EMBODIMENTS

Various exemplary embodiments, features, and aspects of the invention will be described in detail below with reference to the drawings.

First Embodiment

Figure 1:
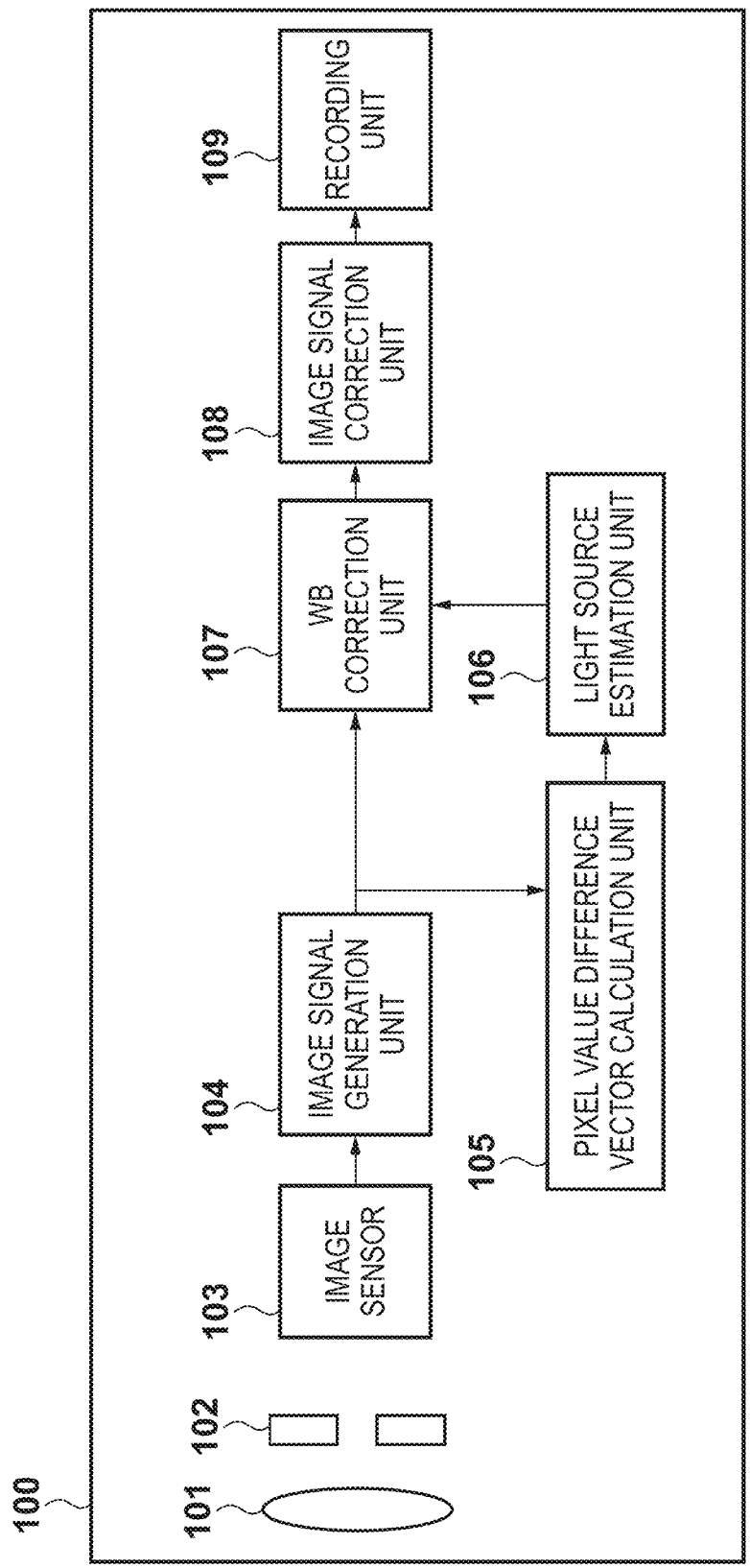
FIG. 1 is a block diagram showing the arrangement of an image capturing apparatus according to the first embodiment.

An image processing apparatus according to the first embodiment will be described below with reference to FIGS. 1 to 5. FIG. 1 is a block diagram showing the arrangement of an image capturing apparatus as an example of an image processing apparatus including a light source estimation function according to the first embodiment. Referring to FIG. 1, an image capturing apparatus 100 includes the following arrangement in addition to a lens 101 and shutter 102. An image sensor 103 converts incoming light into an electrical signal. An image signal generation unit 104 generates image signals (R, G, and B) of an input image. A pixel value difference vector calculation unit 105 calculates a difference value between image signals. A light source estimation unit 106 estimates a color of a light source which illuminates an object in an input image, and calculates a white balance gain. A WB correction unit 107 applies white balance correction to image signals based on the set white balance gain. An image signal correction unit 108 executes various kinds of correction processing such as gamma correction and color balance correction for image signals. A recording unit 109 stores image signals in a recording medium (not shown). An overview of the arrangement of the image capturing apparatus 100 has been described.

An overview of an operation of the image capturing apparatus 100 will be described below. When the user presses a shutter button of an operation unit (not shown), the shutter 102 is opened only for a predetermined period of time. As a result, light enters the image sensor 103 via the lens 101. The image sensor 103 converts incident light into an electrical signal, and outputs the electrical signal to the image signal generation unit 104. The image signal generation unit 104 generates pixel values (R, G, and B) for respective pixels based on the input electrical signal, and outputs them to the pixel value difference vector calculation unit 105 and WB correction unit 107. The pixel value difference vector calculation unit 105 calculates differences between input pixel values, and outputs results to the light source estimation unit 106. The light source estimation unit 106 estimates a light source color based on the pixel value difference calculation results, and calculates a white balance gain. Details of the pixel value difference calculation processing and light source estimation processing will be described later. The WB correction unit 107 applies white balance correction to the input image signals based on the calculated white balance gain, and outputs the corrected image signals to the image signal correction unit 108. The image signal correction unit 108 applies various kinds of correction processing to the input image signals, and outputs the corrected image signals to the recording unit 109. The recording unit 109 records the input image signals in a recording medium. The overview of the processing operation of the image capturing apparatus 100 has been described.

The light source color estimation method according to this embodiment will be described in detail below.

Figure 2:
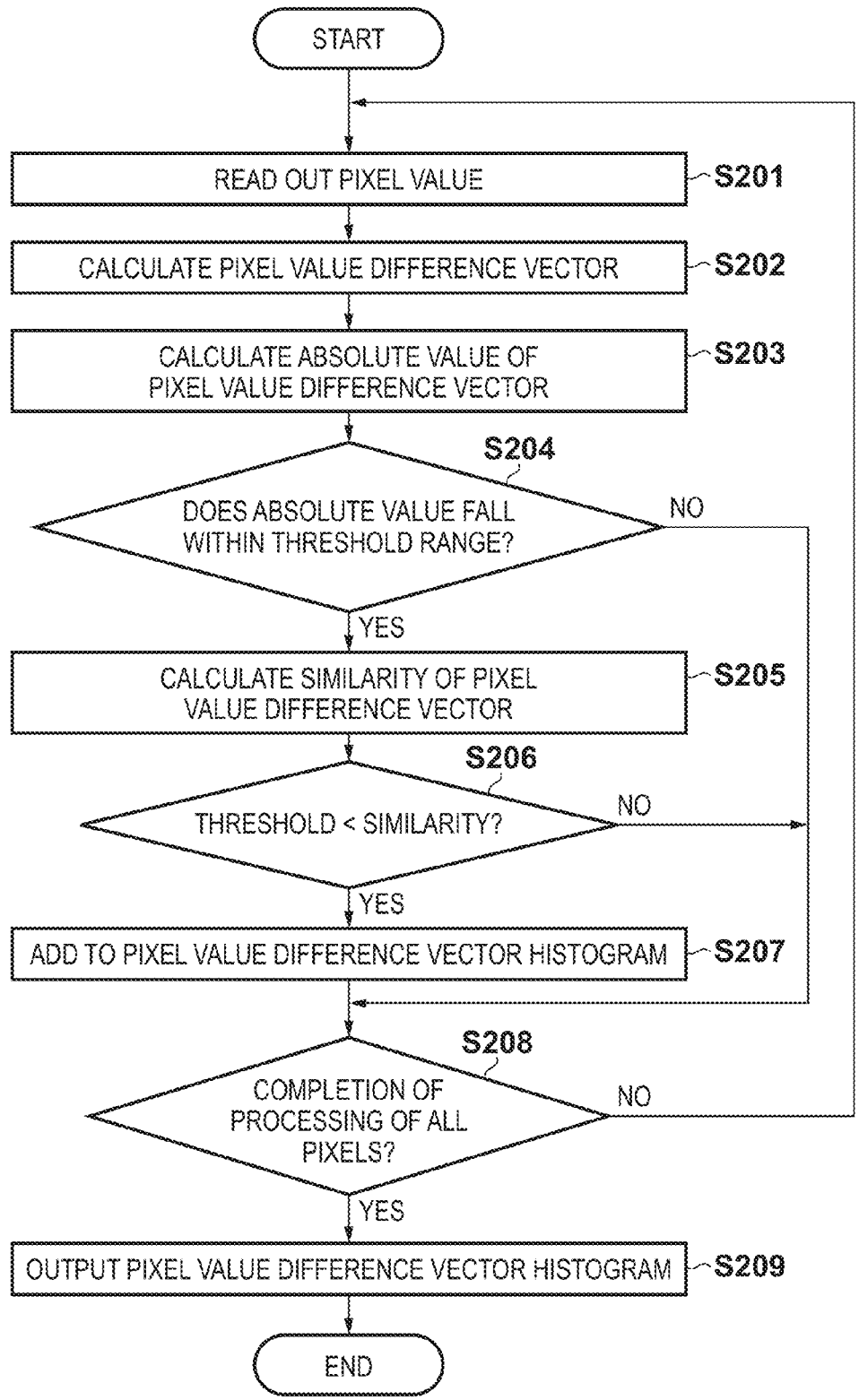
FIG. 2 is a flowchart showing pixel value difference calculation processing according to the first embodiment.

Details of the pixel value difference calculation processing executed by the pixel value difference vector calculation unit 105 will be described first with reference to FIG. 2 and FIGS. 3A and 3B. FIG. 2 is a flowchart showing the processing executed by the pixel value difference vector calculation unit 105. FIGS. 3A and 3B are views showing pixels of an input image. Mesh frames in FIGS. 3A and 3B represent respective pixels of an input image.

As shown in FIG. 3A, let $P(i, j)$ be a pixel value at coordinates $(i, j)$ of an input image. Since a pixel value includes three components R, G, and B, it is described as:

$$P(i,j)=(R(i,j),G(i,j),B(i,j))$$

Referring back to the flowchart shown in FIG. 2, the pixel value difference vector calculation unit 105 reads out a pixel value $P(i, j)$ generated by the image signal generation unit 104 in step S201. In this case, when the pixel value $P(i, j)$ is read out, a pixel value of a pixel of interest and those of adjacent pixels which are located at positions of a predetermined interval d (for example, d=2 pixels) are read out together. More specifically, pixel values $P(i, j-d)$, $P(i, j+d)$, $P(i-d, j)$, and $P(i+d, j)$ of pixels separated from the position $(i, j)$ of the pixel of interest by the predetermined interval in the up, down, left, and right directions are read out together. The pixel value difference vector calculation unit 105 sequentially reads out pixel values of respective pixels in the input image, as described above.

Next, in step S202, the pixel value difference vector calculation unit 105 calculates pixel value differences between the readout pixel of interest and adjacent pixels. In this case, as shown in FIG. 3B, let $dU(i, j)$, $dD(i, j)$, $dL(i, j)$, and $dR(i, j)$ be pixel value differences between adjacent pixels in neighboring directions of the four directions, that is, the up, down, left, and right directions on an input image plane. That is, we have:

$$dU(i,j)=P(i,j)-P(i,j-d)$$

$$dD(i,j)=P(i,j)-P(i,j+d)$$

$$dL(i,j)=P(i,j)-P(i-d,j)$$

$$dR(i,j)=P(i,j)-P(i+d,j)$$

The pixel value P includes three color components (R, G, B). Therefore, the pixel value difference can be considered as a vector including difference values of three color components, that is, an R difference value, G difference value, and B difference value, as described by:

$$\begin{aligned}dU(i, j) &= P(i, j) - P(i, j-d) \\ &= (R(i, j) - R(i, j-d), G(i, j) - \\ &\quad G(i, j-d), B(i, j) - B(i, j-d))\end{aligned}$$

Such vector is called a pixel value difference vector.

In step S203, the pixel value difference vector calculation unit 105 calculates the magnitudes of the pixel value differences, that is, absolute values of the calculated pixel value difference vectors. More specifically, the pixel value difference vector calculation unit 105 calculates $|dU(i,j)|$, $|dp(i,j)|$, $|dL(i,j)|$, and $|dR(i,j)|$.

The pixel value difference vector calculation unit 105 determines in step S204 whether or not the absolute values of the calculated pixel value difference vectors fall within a predetermined threshold range. In this case, a case in which the absolute values of the pixel value difference vectors fall below a predetermined lower limit threshold corresponds to a case in which reflected light from an object is nearly uniform, and specular reflection components cannot be accurately estimated based on the pixel value differences. Conversely, a case in which the absolute values of the pixel value difference vectors exceed an upper limit threshold normally corresponds to a boundary between objects or a region where a light illumination state is not uniform. In this case as well, the calculated difference values cannot be used in estimation of specular reflection components. Therefore, when at least one of the absolute values of the calculated pixel value difference vectors falls outside the threshold range, the pixel value difference vector calculation unit 105 determines that the pixel of interest is not used in light source estimation, and the process jumps to step S208. In other words, a pixel having the magnitudes of the pixel value differences, which fall outside the predetermined threshold range, is excluded from calculation targets of pixel value difference distributions. If all of the absolute values of the calculated pixel value difference vectors fall within the threshold range, the process advances to step S205.

In step S205, the pixel value difference vector calculation unit 105 calculates similarities between the calculated pixel value difference vectors. Note that the similarity is an index which represents a degree of similarity between directions of the pixel value difference vectors. In this case, assume that as the similarity, a direction cosine of an angle the pixel value difference vectors make is calculated, and its absolute value is used. More specifically, let sUL be a similarity between dU and dL, sLD be that between dL and dD, sDR be that between dD and dR, and sRU be that between dR and dU, for example, sUL is given by:

$$sUL(i,j)=|dot(dU(i,j),dL(i,j))/(|dU(i,j)||dL(i,j)|)|$$

where dot(A, B) represents an inner products of vectors A and B. The other direction can be similarly expressed.

In step S206, the pixel value difference vector calculation unit 105 compares the calculated four similarities with a predetermined similarity threshold th_sim. Assume that, for example, the similarity threshold th_sim=0.9. If all of the calculated similarities sUL, sLD, sDR, and sRU exceed the similarity threshold th_sim, the pixel value difference vector calculation unit 105 determines that pixel of interest as an effective pixel, and the process advances to step S207. If at least one of the similarities is not more than the similarity threshold, the pixel value difference vector calculation unit 105 determines that pixel of interest as an ineffective pixel, and the process jumps to step S208. That is, in this case, that pixel of interest is excluded from targets to be added (step S207) to a pixel value difference histogram.

In this manner, only pixel value difference vectors calculated from a flat region including no boundary between objects are extracted using the similarities of the pixel value difference vectors. Conversely, the pixel value difference vectors calculated at a boundary between objects or a region near the boundary are excluded from light source estimation processing.

The reason why such discrimination is possible is as follows. When all of the pixel value difference vectors to be compared correspond to differences between pixels which belong to the same object, directions of the difference vectors agree with a direction corresponding to a light source color. On the other hand, when the pixel value difference vectors to be compared include a difference between different objects, directions of the difference vectors have variations in the direction corresponding to the light source color and in a direction corresponding to a difference between object colors.

Figure 4A:
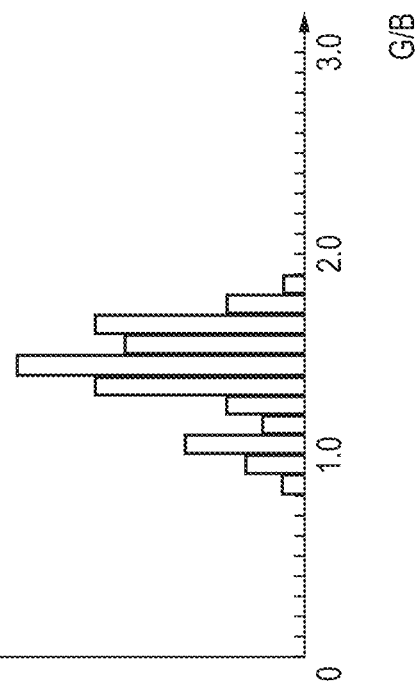
FIGS. 4A and 4B are graphs showing histograms in a direction of a pixel value difference vector.
Figure 4B:
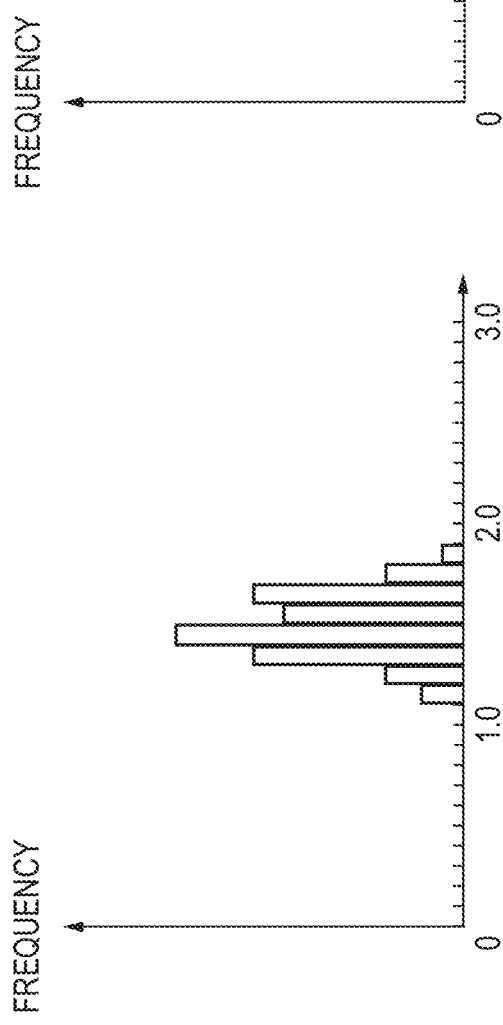

In step S207, the pixel value difference vector calculation unit 105 calculates pixel value difference distributions. More specifically, the pixel value difference vector calculation unit 105 adds the pixel value difference vectors of the pixel determined as the effective pixel to a pixel value difference vector histogram. FIGS. 4A and 4B show an example of histograms. FIGS. 4A and 4B show histograms which represent distributions of R and B components of the pixel value difference vectors. Abscissas G/R and G/B plot ratios between G and R components and those between G and B components of the pixel value difference vectors. More specifically, these ratios are respectively given by:

$$G/R=(G(i,j)-G(i-d,j))/(R(i,j)-R(i-d,j))$$

$$G/B=(G(i,j)-G(i-d,j))/(B(i,j)-B(i-d,j))$$

However, the above description has been given using dL(i, j) as the pixel value difference vector, but any of dU, dD, dL, and dR may be used. Alternatively, a histogram may be generated based on a plurality of pixel value difference vectors (for example, using an average value of dL(i, j) and dU(i, j)). In this manner, the ratios G/R and G/B are calculated for the calculated pixel value difference vectors, and frequencies of histogram sections corresponding to these values are incremented.

The pixel value difference vector calculation unit 105 determines in step S208 whether or not processing is complete for all pixels of the input image. If the processing is complete, the process advances to step S209; otherwise, the process returns to step S201 to repeat the series of processes.

In step S209, the pixel value difference vector calculation unit 105 outputs the calculated pixel value difference vector histogram data to the light source estimation unit 106.

The sequence of the processing executed by the pixel value difference vector calculation unit 105 has been described.

Figure 5:
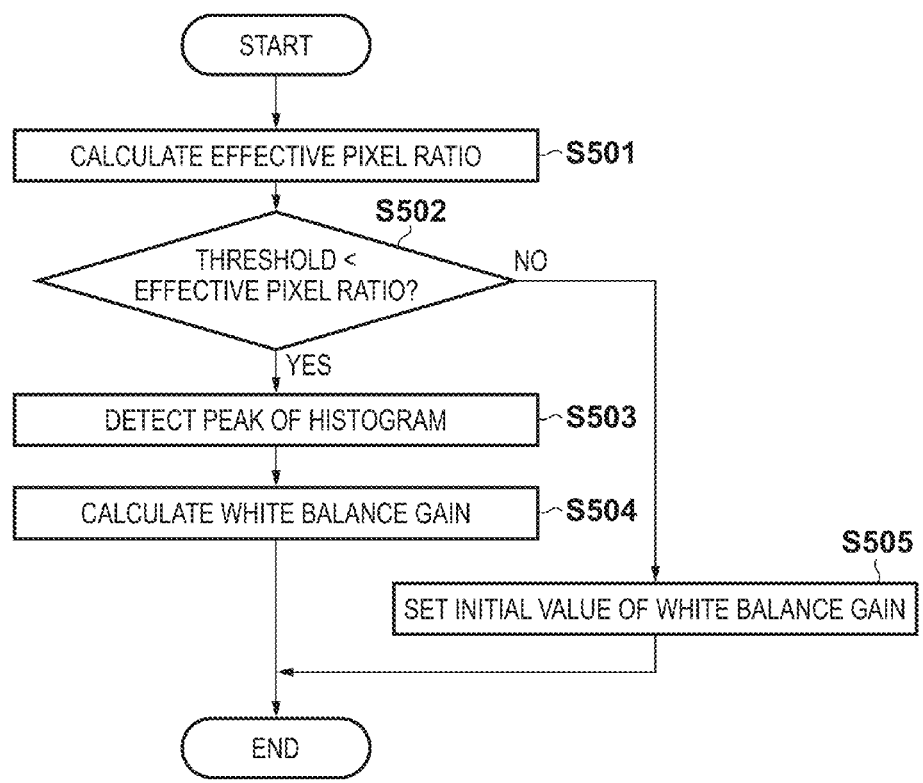
FIG. 5 is a flowchart showing light source estimation processing according to the first embodiment.

The light source estimation processing executed by the light source estimation unit 106 will be described below with reference to the flowchart shown in FIG. 5. The light source estimation unit 106 estimates a light source color based on the histograms calculated by the pixel value difference vector calculation unit 105, and calculates a white balance gain.

In step S501, the light source estimation unit 106 calculates a ratio of pixels determined as effective pixels, which occupy the input image. More specifically, the light source estimation unit 106 calculates a sum total of frequencies of all sections of the histograms, and divides that sum total by the number of pixels of the input image, thus calculating the ratio.

In step S502, the light source estimation unit 106 compares the calculated effective pixel ratio with a predetermined threshold. If the effective pixel ratio is not less than the predetermined threshold, the process advances to step S503; otherwise, the process advances to step S505.

In step S503, the light source estimation unit 106 determines peak positions of the distributions of the histograms. Then, the light source estimation unit 106 calculates color component values corresponding to the peak positions. More specifically, the light source estimation unit 106 detects sections corresponding to highest frequencies, and calculates values G/R and G/B corresponding to these sections. Alternatively, the light source estimation unit 106 may detect sections corresponding to the highest frequencies, may extract sections within a predetermined range before and after these sections, and may calculate average values of corresponding values G/R and G/B while weighting using the frequencies of the respective sections.

The values G/R and G/B calculated in this step represent light source color estimation results, which are estimated based on the pixel value differences. In this way, using peak position information of the histograms corresponding to directions of the pixel value difference vectors, specular reflection components can be accurately extracted. This is because in a general case in which an input image includes a plurality of specular reflection objects, pixel value difference vectors corresponding to a light source color are calculated at a plurality of positions in the input image. For this reason, frequencies of occurrence corresponding to directions corresponding to the light source color in the histograms increase to form peaks.

In step S504, the light source estimation unit 106 outputs the calculated values G/R and G/B as R and B gains used at the time of white balance correction to the WB correction unit 107. In step S505, since this corresponds to a case in which light source estimation fails using the pixel value differences, the light source estimation unit 106 outputs pre-set default values to the WB correction unit 107 as white balance gain values.

The processing executed by the light source estimation unit 106 has been described.

As described above, according to this embodiment, the image processing apparatus, which estimates a light source color based on pixel value differences, estimates the light source color based on similarities and distributions of the pixel value differences. More specifically, similarities of directions of pixel value difference vectors and peaks of distributions of directions of pixel value difference vectors are calculated and are used in estimation. Thus, pixel value difference vectors between different objects and the like are excluded, and a light source color can be accurately estimated.

Note that in this embodiment, pixel value difference vectors are calculated for pixels which are located in four different directions when viewed from a pixel of interest. However, the present invention is not limited to such specific pixel value difference vector calculation method and determination method based on similarities. For example, two directions, that is, up and left directions when viewed from a pixel of interest may be used, and a pixel located in an obliquely upper right direction and the like may be used.

In addition to the directions, distances from a pixel of interest may be converted into a plurality of values to calculate pixel value difference vectors. For example, a difference vector between a pixel of interest and a pixel which is separated from the pixel of interest by four pixels in the right direction, and that between the pixel of interest and a pixel which is separated from the pixel of interest by six pixels in the right direction may be respectively calculated to calculate their similarity to be used in estimation. In this manner, pixel values need only be read out for each horizontal line, thus allowing simpler processing.

In this embodiment, a similarity of pixel value difference vectors is determined using an angle the pixel value difference vectors make. However, the present invention is not limited to such specific similarity determination method. Any other methods may be used as long as they calculate a similarity of directions of pixel value difference vectors. For example, pixel value difference vectors may be expressed on a three-dimensional polar coordinate space, and a similarity of coordinate values which express directions may be used.

Also, this embodiment has explained the case in which when calculated similarities include at least one outlier, that pixel is not used. However, the present invention is not limited to such specific determination method for similarities. For example, a case will be examined below wherein similarities between pixel value difference vectors in three directions of those calculated for four directions are high, and only a pixel value difference vector in the one remaining direction has lower similarities to other vectors. In this case, one of the three directions corresponding to the high similarities may be selected, and a pixel value difference vector corresponding to that direction may be added to a histogram. Thus, distributions of directions of pixel value difference vectors can be calculated even under the influence of noise or the like.

This embodiment has explained the method which determines the distributions of directions of pixel value difference vectors using histograms. However, the present invention is not limited to such specific method for calculating distributions of pixel value difference vectors. For example, distributions of directions of pixel value difference vectors may be calculated using, for example, a least square method on R-G and B-G planes on which pixel value difference vectors are projected.

Second Embodiment

As the second embodiment of the present invention, a case will be described below wherein a reduced image obtained by reducing an input image is used upon calculation of pixel value difference vectors.

Figure 6:
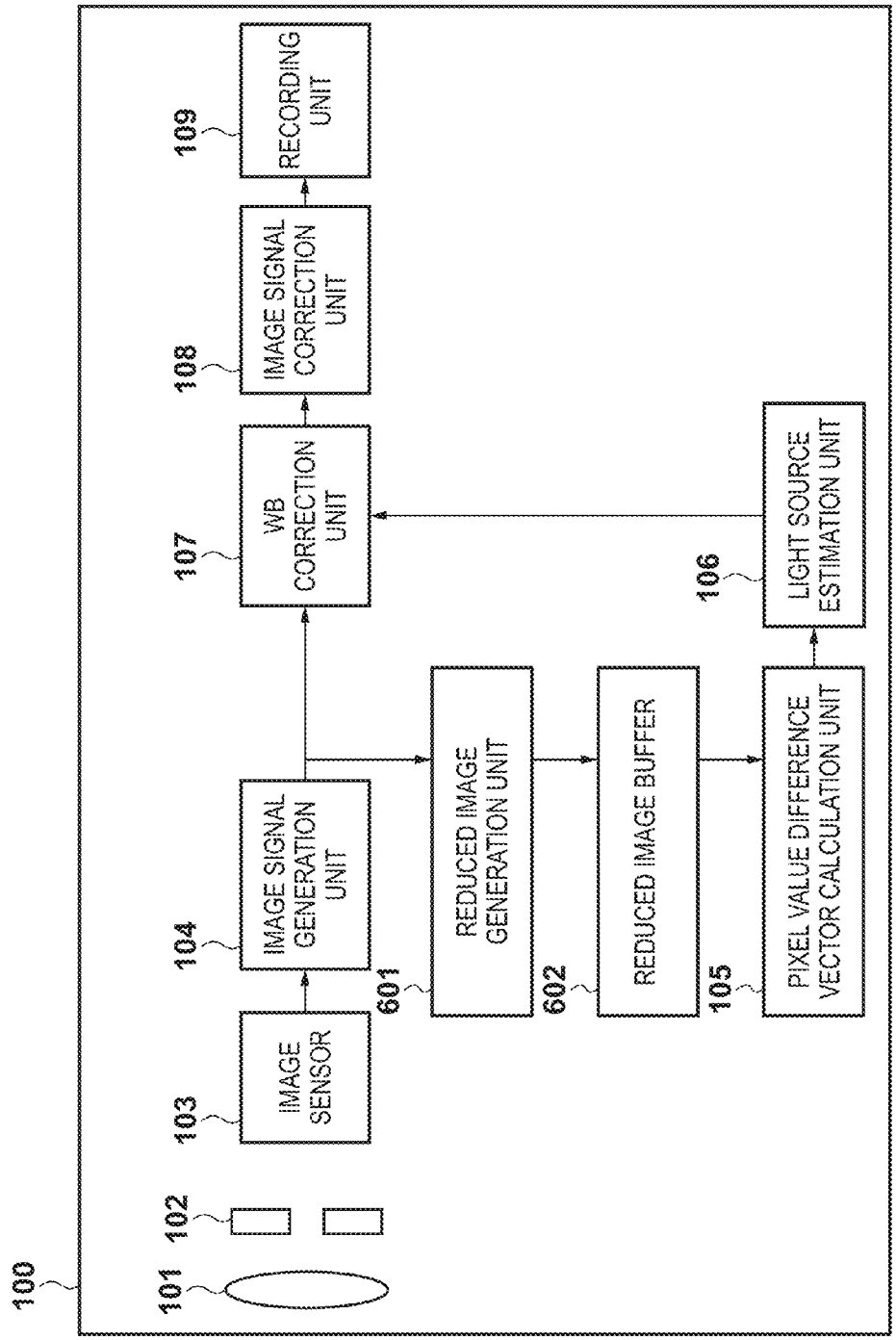
FIG. 6 is a block diagram showing the arrangement of an image capturing apparatus according to the second embodiment.

FIG. 6 shows the arrangement according to the second embodiment. The same reference numerals denote the same units as those in the arrangement according to the first embodiment shown in FIG. 1, and a description thereof will not be repeated. In FIG. 6, a reduced image generation unit 601 and reduced image buffer 602 are added.

The reduced image generation unit 601 generates a reduced image obtained by reducing an input image generated by an image signal generation unit 104 using a known method. The reduced image buffer 602 records reduced image data generated by the reduced image generation unit 601.

An overview of an operation of an image capturing apparatus according to the second embodiment will be described below. As in the first embodiment, when the user presses a shutter button, a series of image capturing operations are started. The image signal generation unit 104 outputs generated image signals to the reduced image generation unit 601 and a WB correction unit 107. The reduced image generation unit 601 reduces the input image at a predetermined reduction ratio, outputs the generated reduced image to the reduced image buffer 602, and records the reduced image in the reduced image buffer 602. A pixel value difference vector calculation unit 105 reads out pixel values of the reduced image from the reduced image buffer 602, and calculates pixel value difference vectors. The processing operation of the pixel value difference vector calculation unit 105 is the same as that of the first embodiment shown in FIG. 2. However, an interval d of pixels for which a difference is to be calculated is set to be d=1 to calculate differences between neighboring pixels in the reduced image. That is, to space between pixels by a given interval upon calculation of differences in the first embodiment corresponds to reduction of the input image in this embodiment.

After that, a series of processes until a light source estimation unit 106 estimates a light source color, the WB correction unit 107 executes white balance correction, and corrected image signals are stored by a recording unit 109 are the same as those in the first embodiment, and a description thereof will not be repeated.

As described above, in the aforementioned embodiment, an image processing apparatus, which estimates a light source color based on pixel value differences, estimates the light source color based on similarities and distributions of the pixel value differences. In addition, this embodiment has explained the case in which a reduced image is generated by reducing an input image, and differences between pixel values of the reduced image are calculated. Thus, a light source color can be accurately estimated by excluding the influence of noise and the like included in the input image.

Note that this embodiment has explained the case in which pixel value difference vectors are calculated between neighboring pixels (interval d=1) in the reduced image. However, the present invention is not limited to such specific pixel value difference calculation method. For example, a value such as a pixel interval d=2 may be used.

Third Embodiment

As the third embodiment of the present invention, a case will be described wherein effective pixel determination also uses conditional determination for respective small blocks obtained by dividing an input image in addition to determination using similarities for respective pixels.

FIG. 7 shows the arrangement of an image capturing apparatus according to the third embodiment. The same reference numerals denote the same units as those in the arrangement of the first embodiment shown in FIG. 1, and a description thereof will be omitted. In FIG. 7, a block division unit 701 is newly added. The block division unit 701 divides an input image generated by an image signal generation unit 104 into a plurality of blocks.

Light source estimation processing according to the third embodiment will be described below with reference to FIGS. 8 and 9. FIGS. 8 and 9 are flowcharts respectively showing the processes to be executed by a pixel value difference vector calculation unit 105 and light source estimation unit 106.

The pixel value difference vector calculation unit 105 calculates pixel value difference vectors and generates histograms of the pixel value difference vectors as in the first embodiment. Unlike in the first embodiment, the pixel value difference vector calculation unit 105 reads out pixel values and generates histograms of pixel value difference vectors for respective blocks. FIG. 10 is a view showing blocks obtained by dividing an input image. As shown in FIG. 10, processing is executed by dividing an input image into 4×4 blocks.

In step S801, the pixel value difference vector calculation unit 105 reads out pixel values for each block divided by the block division unit 701. As in the first embodiment, pixel values of a pixel of interest and adjacent pixels located in up, down, left, and right direction of the pixel of interest are read out.

In steps S802 to S806, pixel value difference vectors and their similarities are calculated, and an effective pixel is determined using the similarities as in the first embodiment. In step S807, values G/R and G/B corresponding to the effective pixel are added to histograms of pixel value difference vectors as in the first embodiment. However, unlike in the first embodiment, histograms of pixel value difference vectors are generated for each image block.

The pixel value difference vector calculation unit 105 determines in step S808 whether or not processing is complete for all pixels in the image block. If the processing is complete, the process advances to step S809; otherwise, the process returns to step S801 to execute the same processes for the next pixel. The pixel value difference vector calculation unit 105 determines in step S809 whether or not processing is complete for all blocks of the input image. If the processing is complete, the process advances to step S810, and the pixel value difference vector calculation unit 105 outputs histogram data for respective blocks to the light source estimation unit 106, thus ending the processing. On the other hand, if the processing is not complete yet, the process returns to step S801 to execute the same processing for the next block.

The processing to be executed by the pixel value difference vector calculation unit 105 has been described.

Processing to be executed by the light source estimation unit 106 will be described below. The light source estimation unit 106 calculates ratios of pixels determined as effective pixels for respective blocks based on pixel value difference histograms for respective blocks, and uses the calculated ratios in light source estimation.

The sequence of the processing will be described below with reference to the flowchart shown in FIG. 9.

In step S901, the light source estimation unit 106 reads out information of the histograms generated by the pixel value difference vector calculation unit 105 for each block. In step S902, the light source estimation unit 106 calculates an effective pixel ratio for each block from the readout histograms. That is, the light source estimation unit 106 calculates a ratio by dividing a total value of frequencies of histograms by the number of pixels included in each block. In step S903, the light source estimation unit 106 compares the calculated effective pixel ratio with a predetermined threshold. If the effective pixel ratio is not less than the threshold, the process advances to step S904; otherwise, the process jumps to step S905, and the light source estimation unit 106 determines that the block is not used in light source color estimation.

In step S904, the light source estimation unit 106 adds the histograms for each block to calculate those for the entire input image. The light source estimation unit 106 determines in step S905 whether or not processing is complete for all blocks. If the processing is complete, the process advances to step S906, and the light source estimation unit 106 calculates peaks of the histograms, thus calculating white balance gains. Since the processing in this step is the same as that in the method described in the first embodiment, a description will not be repeated. If the processing is not complete yet, the process returns to step S901 to read out information of histograms of the next block.

The contents of the processing to be executed by the light source estimation unit 106 in this embodiment have been described.

As described above, in the first and second embodiments, an image processing apparatus, which estimates a light source color based on pixel value differences, estimates the light source color based on similarities and distributions of the pixel value differences. In addition, the third embodiment controls to determine similarities of pixel value difference vectors for respective blocks obtained by dividing an input image, and to execute light source estimation using only blocks each of which includes effective pixels with high similarities at a predetermined ratio or more. Thus, since light source estimation can be executed using only a region which has a large area occupied by a single object and readily causes specular reflection, the accuracy of the light source estimation can be improved.

Fourth Embodiment

The light source estimation method disclosed in Japanese Patent Laid-Open No. 2007-013415 extracts specular reflection components under the assumption that when pixels have luminance differences, reflected light from high-luminance pixels include many specular reflection components. However, luminance differences between pixels do not often depend on specular reflection components, and specular reflection components often fail to be correctly extracted in such case. For example, such failure occurs when an object has color unevenness or a pattern. In this case, pixel value differences calculated between a region including color unevenness or a pattern and its surrounding region correspond to object color differences, but they do not correspond to specular reflection components. The intensity of light emitted by a light source and entering an object may not be uniform. In this case, pixel value differences to be calculated correspond to the light intensity differences (magnitudes of diffuse reflection light) and do not correspond to specular reflection components. In this manner, even when pixels have luminance differences, if the differences are not derived from specular reflection components, the conventional method cannot accurately estimate a light source color.

Hence, the following fourth to sixth embodiments will explain a technique for extracting a specular reflection region from an image, and accurately estimating a light source color.

Figure 11:
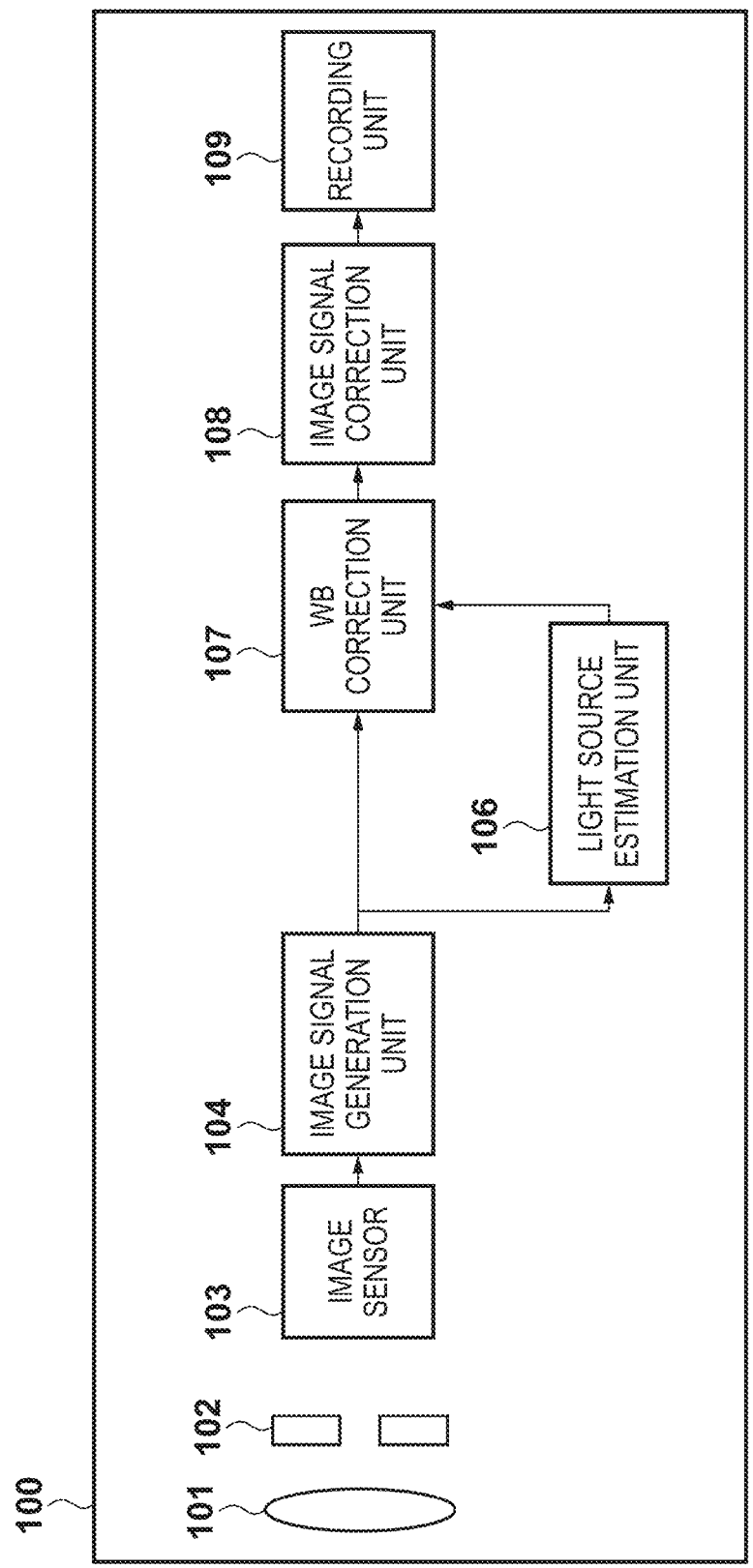
FIG. 11 is a block diagram showing the arrangement of an image capturing apparatus according to the fourth embodiment.

An image processing apparatus according to the fourth embodiment will be described below. FIG. 11 is a block diagram showing the arrangement of an image capturing apparatus as an example of an image processing apparatus including a light source estimation function according to the fourth embodiment. The arrangement shown in FIG. 11 is nearly the same as that shown in FIG. 1, but a pixel value difference vector calculation unit 105 is omitted in FIG. 11.

An overview of an operation of an image capturing apparatus 100 according to this embodiment will be described below. When the user presses a shutter button of an operation unit (not shown), a shutter 102 is opened only for a predetermined period of time. As a result, light enters an image sensor 103 via a lens 101. The image sensor 103 converts incident light into an electrical signal, and outputs the electrical signal to an image signal generation unit 104. The image signal generation unit 104 generates pixel values (R, G, and B) for respective pixels based on the input electrical signal, and outputs them to the light source estimation unit 106 and WB correction unit 107. The light source estimation unit 106 estimates a light source color by estimating a specular reflection region from the input image, and calculating pixel value differences in that region. Also, the light source estimation unit 106 calculates a white balance gain based on the light source color estimation result. Details of light source estimation processing in this unit will be described later. The light source estimation unit 106 outputs the calculated white balance gain to the WB correction unit 107. The WB correction unit 107 applies white balance correction to the input image signals based on the calculated white balance gain, and outputs the corrected image signals to the image signal correction unit 108. The image signal correction unit 108 applies various kinds of correction processing to the input image signals, and outputs the corrected image signals to the recording unit 109. The recording unit 109 records the input image signals in a recording medium. The overview of the processing operation of the image capturing apparatus 100 has been described.

Figure 12:
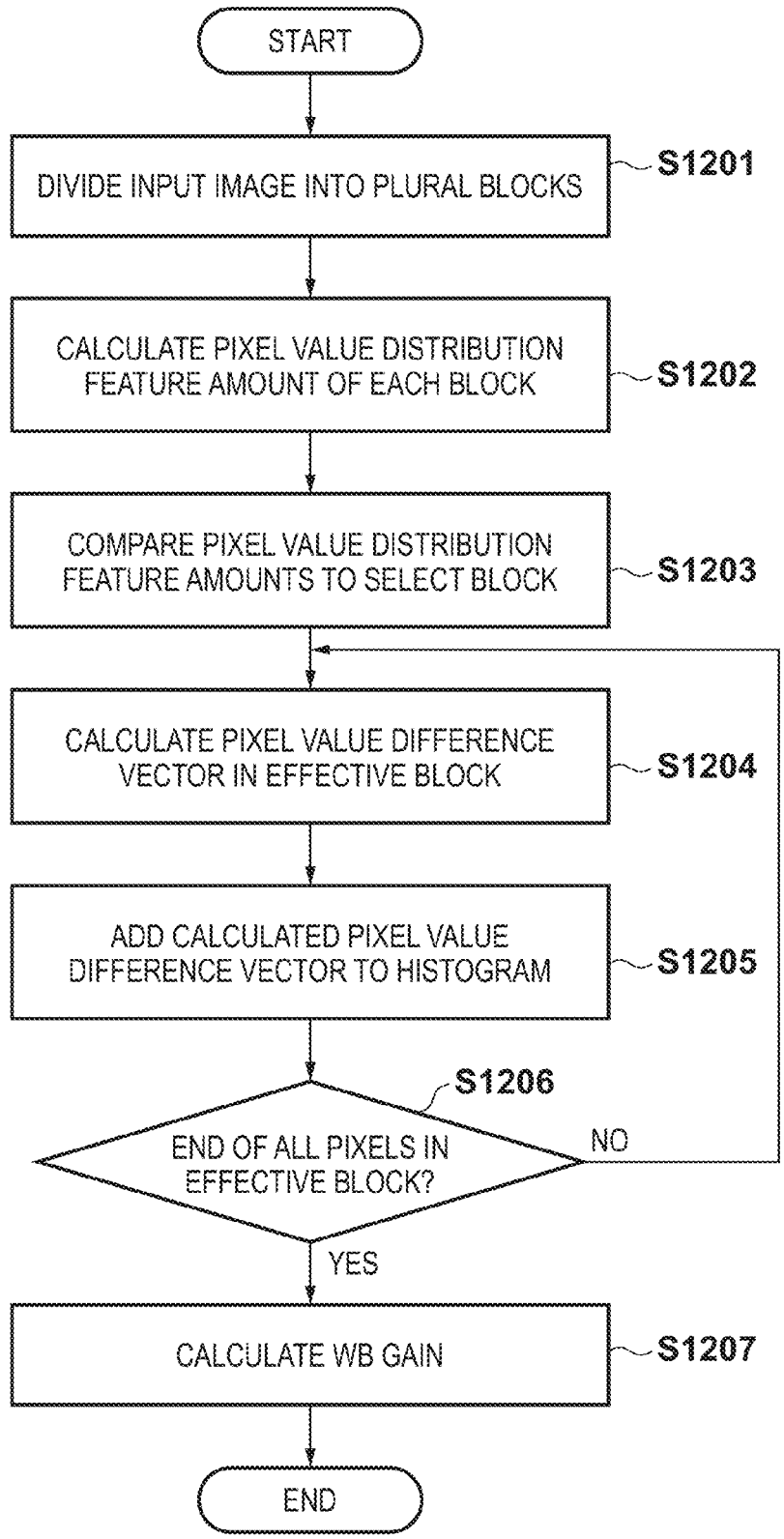
FIG. 12 is a flowchart showing the sequence of light source estimation processing according to the fourth embodiment.

The light source color estimation method according to this embodiment will be described below. FIG. 12 is a flowchart showing the processing to be executed by the light source estimation unit 106.

In step S1201, the light source estimation unit 106 divides an input image signal generated by the image signal generation unit 104 into a plurality of blocks (for example, 8×8=64). FIG. 13 shows an example of an input image divided into blocks. As shown in FIG. 13, divided blocks are respectively called a block 1, block 2, . . . , block 64 in turn from the upper left block.

In step S1202, the light source estimation unit 106 calculates pixel value distribution feature amounts for respective divided blocks (feature amount calculation processing). Note that a pixel value distribution feature amount means an evaluation value which represents a feature of a distribution of pixel values of pixels included in each block. A case will be described below wherein a width of a luminance histogram is used as the pixel value distribution feature amount.

The light source estimation unit 106 calculates luminance values of pixels in each of the divided blocks to generate a luminance histogram. FIG. 14 shows an example of the luminance histogram. A section along the abscissa of the histogram plots luminance values of pixels, and the ordinate plots the number of pixels (frequency) corresponding to each luminance value. Next, the light source estimation unit 106 calculates a width of distributions of the luminance histogram. Note that the width of the luminance histogram indicates the number of sections of a series of signal values corresponding to the numbers of pixels which are not less than a predetermined threshold Th_n. In case of the luminance histogram shown in FIG. 14, a width W=6. However, even when frequencies are not less than the threshold, if a section having a frequency not more than the threshold Th_n is included when viewed from a peak section of the histogram, that section is not included in the width calculation.

The light source estimation unit 106 generates luminance histograms for respective blocks 1 to 64, and calculates widths W of the luminance histograms.

In step S1203, the light source estimation unit 106 compares the calculated pixel value distribution feature amounts of the respective blocks to extract a specular reflection region. More specifically, the light source estimation unit 106 compares the widths W of the luminance histograms of the respective blocks, and selects blocks as many as a predetermined number in descending order of width W. For example, the light source estimation unit 106 selects blocks having top 10% widths of the luminance histograms. In this case, these selected blocks will be referred to as effective blocks. In a specular reflection region, since luminance increases abruptly, a luminance distribution range extends over a broad range, and by selecting blocks having larger widths of the luminance histograms, the specular reflection region can be estimated and extracted.

In step S1204, the light source estimation unit 106 calculates a pixel value difference vector for respective pixels in effective blocks (difference calculation processing). The pixel value difference vector calculation method will be described below with reference to FIGS. 3A and 3B. As described above, mesh frames in FIGS. 3A and 3B indicate respective pixels of an input image. As shown in FIG. 3A, let P(i, j) be a pixel value at coordinates (i, j) of the input image. Since the pixel value includes three, that is, R, G, and B components, it is expressed by:

$$P(i,j)=(R(i,j),G(i,j),B(i,j))$$

In this case, differences between the pixel value P(i, j) of a pixel of interest and pixel values P(i, j−d) and P(i−d, j) of adjacent pixels located at positions separated by an interval d in the up and left positions from the position of the pixel of interest are calculated as pixel value differences. Note that as shown in FIG. 3B, let dU(i, j) and dL(i, j) respectively be differences between the pixel P(i, j) of interest and the pixels P(i, j−d) and P(i−d, j). That is, these differences are respectively given by:

$$dU(i,j)=P(i,j)-P(i,j-d)$$

$$dL(i,j)=P(i,j)-P(i-d,j)$$

Since the pixel value P includes three components (R, G, B), each pixel value difference can be considered as a vector including three components, that is, an R difference value, G difference value, and B difference value, as described by:

$$dU(i, j) = P(i, j) - P(i, j-d)$$
$$= (R(i, j) - R(i, j-d), G(i, j) - G(i, j-d), B(i, j) - B(i, j-d))$$

The pixel value difference vector calculation method in step S1204 has been described.

In step S1205, the light source estimation unit 106 adds the calculated pixel value difference vector to a pixel value difference vector histogram (distribution calculation processing). An example of the pixel value difference vector histogram is as shown in FIGS. 4A and 4B. That is, in FIGS. 4A and 4B, abscissas G/R and G/B plot ratios between G and R components and those between G and B components of the pixel value difference vectors. More specifically, these ratios are respectively given by:

$$G/R = (G(i,j) - G(i-d,j))/(R(i,j) - R(i-d,j))$$

$$G/B = (G(i,j) - G(i-d,j))/(B(i,j) - B(i-d,j))$$

However, the above description has been given using dL(i, j) as the pixel value difference vector, but a histogram may be generated based on a plurality of pixel value difference vectors (for example, using an average value of dL(i, j) and dU(i, j)). In this manner, the ratios G/R and G/B are calculated for the calculated pixel value difference vectors, and frequencies of histogram sections corresponding to these values are incremented.

The light source estimation unit 106 determines in step S1206 whether or not processing is complete for all pixels included in the effective blocks selected in step S1203. If the processing is complete, the process advances to step S1207; otherwise, the process returns to step S1204 to repeat the series of processes.

In step S1207, the light source estimation unit 106 estimates a light source color based on the pixel value difference vector histogram, and calculates white balance gains. More specifically, the light source estimation unit 106 detects a section corresponding to the highest frequency of the histogram, and calculates values G/R and G/B corresponding to that section. Alternatively, the light source estimation unit 106 may detect a section having the highest frequency, may extract sections within a predetermined range before and after the detected section, and may calculate average values of the corresponding values G/R and G/B by weighting using frequencies of the respective sections.

The calculated values G/R and G/B represent light source color estimation results estimated based on the pixel value differences. The light source estimation unit 106 outputs the calculated values G/R and G/B to the WB correction unit 107 as R and B gains at the time of white balance correction, thus ending the processing.

The processing executed by the light source estimation unit 106 has been described.

As described above, according to this embodiment, an image processing apparatus, which estimates a light source color based on pixel value differences, calculates pixel value distribution feature amounts for respective blocks obtained by dividing an image, and extracts a specular reflection region. More specifically, widths of luminance histograms of respective blocks are calculated, and blocks having widths larger than a predetermined value are selected and are used in pixel value difference calculations. Thus, upon extraction of specular reflection components, the influences of color unevenness and an intensity distribution of diffuse reflection components of an object can be excluded, and a light source color can be accurately estimated. This is because luminance differences caused by stronger specular reflection components are larger than those caused by color unevenness and an intensity distribution of diffuse reflection components of an object.

Note that this embodiment has explained the case in which the luminance histograms are used as pixel value distribution feature amounts of respective blocks. However, the present invention is not limited to such specific pixel value distribution feature amount calculation method. For example, as for luminance values of pixels included in each block, maximum and minimum values of luminance values corresponding to the predetermined number of pixels or more are calculated, and blocks as many as the predetermined number may be selected in descending order of difference between the maximum and minimum values. Alternatively, blocks having the differences not less than a predetermined value may be selected. In this manner, pixel value distribution feature amounts can be calculated by simpler processing.

As the pixel value distribution feature amounts, feature amounts of distributions of not only luminance values but also color signals may be calculated. For example, hue and saturation values are calculated from pixel values of respective pixels to generate hue histograms. In this case, blocks having larger widths of the hue histograms are selected and used. Since irregularly reflected light components depending on an object color and specular reflection components depending on a light source color generally have different hue values, a region corresponding to a broad hue distribution is selected, thus allowing selection of a region corresponding to a distribution of specular reflection components.

Also, both luminance signal distributions and color signal distributions may be used. More specifically, a block which has a large width of a hue histogram but has a small width of a luminance signal histogram is not determined as an effective block. Thus, the extraction accuracy of a specular reflected light region can be enhanced.

Alternatively, distribution feature amounts may be extracted not only the widths of pixel value histograms but also shape features. For example, a block including only one peak shape of a luminance value histogram may be selected as an effective block. Alternatively, blocks as many as the predetermined number may be selected as effective blocks in descending order of peak height of the luminance value histogram, or those having histogram peaks not less than a predetermined value may be selected as effective blocks. That is, arbitrary indices may be used as long as they represent pixel value distribution features in blocks.

Also, this embodiment has explained the method of extracting blocks having top 10% histogram widths in an image. However, the present invention is not limited to such specific selection method of a region used in light source estimation. For example, blocks having histogram widths not less than a predetermined value, which is set in advance, may be selected.

This embodiment has explained the case in which the light source estimation processing is executed using only blocks, pixel value distribution feature amounts of which satisfy the predetermined condition. However, the present invention is not limited to such specific light source estimation processing control method. For example, weighting processing according to widths of luminance histograms may be used. More specifically, control is made to calculate a weight having a larger value as a width of a luminance histogram of each block is larger, and to multiply pixel value difference vectors calculated from respective blocks by the calculated weights. In this manner, results from blocks estimated to cause specular reflection are weighted, thus enhancing the accuracy of the light source estimation result.

Also, information of positional relationships of respective blocks in an input image may be used. More specifically, with reference to a block including a maximal point of a luminance distribution, blocks which neighbor around that blocks are preferentially used. This is because since a bright spot is often generated by specular reflection, specular reflection is more likely to occur around the maximal point of the luminance distribution.

Fifth Embodiment

As the fifth embodiment of the present invention, a case will be described below wherein determination of effective blocks based on distribution feature amounts for respective blocks is made by grouping for respective objects. In this case, one or two or more objects included in an input image are detected, and groups of blocks including images of the corresponding objects are generated for the respective detected objects. Then, the aforementioned pixel value distribution feature amount calculation processing, effective block selection processing, pixel value difference calculation processing, histogram calculation processing, and light source estimation processing are executed for each of the generated groups.

Figure 15:
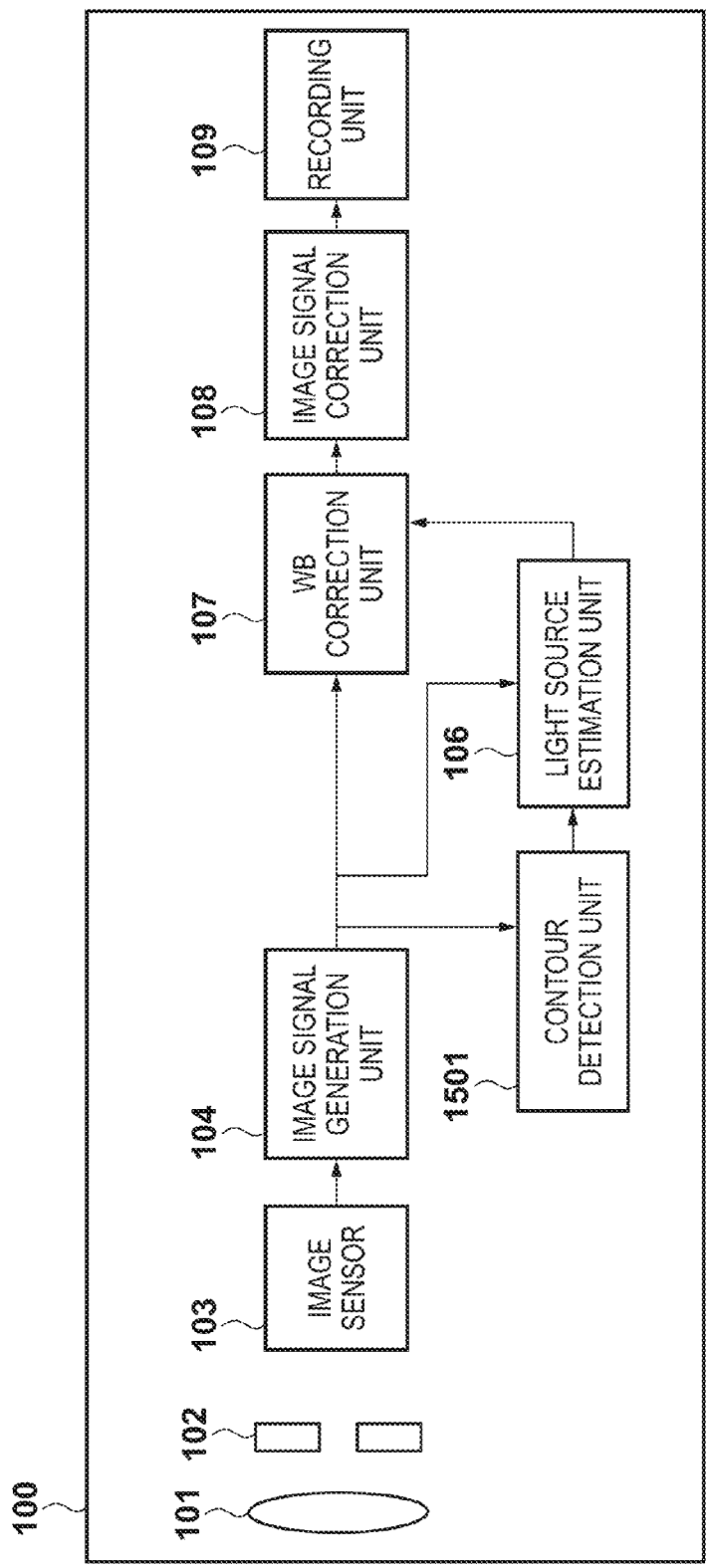
FIG. 15 is a block diagram showing the arrangement of an image capturing apparatus according to the fifth embodiment.

FIG. 15 shows the arrangement of an image capturing apparatus according to the fifth embodiment. The same reference numerals denote the same units as those in the arrangement according to the fourth embodiment shown in FIG. 11, and a description thereof will not be repeated. In FIG. 15, a contour detection unit 1501, which extracts an object contour, is added. The contour detection unit 1501 detects an object contour using a known method (for example, a method of detecting edge signals from an input image).

An overview of an operation of the image capturing apparatus according to the fifth embodiment will be described below. As in the fourth embodiment, when the user presses a shutter button of an operation unit (not shown), a series of image capturing operations are started. An image signal generation unit 104 outputs generated image signals to the contour detection unit 1501, a light source estimation unit 106 and a WB correction unit 107. The contour detection unit 1501 divides an input image into a plurality of blocks, generates contour signals for respective divided blocks, and sorts the respective blocks by those which include object contours and those which do not include any object contours. The contour detection method in the contour detection unit 1501 will be described later. The contour detection unit 1501 outputs information of positions of blocks which are determined not to include any contour to the light source estimation unit 106.

The light source estimation unit 106 extracts specular reflection components based on the input image signals and the detection result of the contour detection unit 1501, and estimates a light source color. Also, the light source estimation unit 106 calculates a white balance gain based on the light source color estimation result. Details of the light source estimation processing will be described later. The light source estimation unit 106 outputs the calculated white balance gain to the WB correction unit 107.

The WB correction unit 107 applies white balance correction to the input image signals based on the calculated white balance gain, and outputs the corrected image signals to an image signal correction unit 108. The image signal correction unit 108 applies various kinds of correction processing to the input image signals, and outputs the corrected image signals to a recording unit 109. The recording unit 109 records the input image signals in a recording medium. The overview of the processing operation of the image capturing apparatus 100 has been described.

The contour detection method in the contour detection unit 1501 will be described below. Upon reception of image signals (R, G, B), the contour detection unit 1501 generates a luminance signal Y, and controls the luminance signal Y to pass through a bandpass filter and contour detection filter (3×3 pixels), thus extracting a contour component in an image.

The contour detection filter will be described below with reference to FIGS. 16A to 16F. FIG. 16A shows pixel values f(i, j) of an input image. FIG. 16B shows a filter to be applied to the input image f(i, j). A new pixel f'(i, j) generated by the filter processing is calculated by:

$$f'(x, y) = \sum_{l=1}^{1} \sum_{k=-1}^{1} f(i+k, j+l)a(k, l)$$

As described above, the contour detection unit 1501 generates an image signal by extracting contours (edges) included in an image. Note that by changing coefficients of the aforementioned filter, contour components in vertical, horizontal, and oblique directions can be extracted. FIGS. 16C to 16F show filter coefficient examples for contour detection in respective directions. FIG. 16C shows an example of a vertical contour (horizontal line) detection filter, and FIG. 16D shows an example of a horizontal contour (vertical line) detection filter. Also, FIG. 16E shows an example of an oblique (upper right line) detection filter, and FIG. 16F shows an example of an oblique (lower right line) detection filter. A case will be described below wherein contour detection is executed using the detection filter shown in FIG. 16C.

The contour detection unit 1501 generates contour signals by the aforementioned method, and calculates a total value of contour signals in each block. Then, the contour detection unit 1501 compares the calculated contour signal with a predetermined threshold, and determines a block having a total value higher than the threshold as a block which includes a contour, and a block having a total value lower than the threshold as a block which does not include any contour. The contour detection unit 1501 outputs position information of blocks which do not include any contours to the light source estimation unit 106, thus ending the processing.

Figure 17:
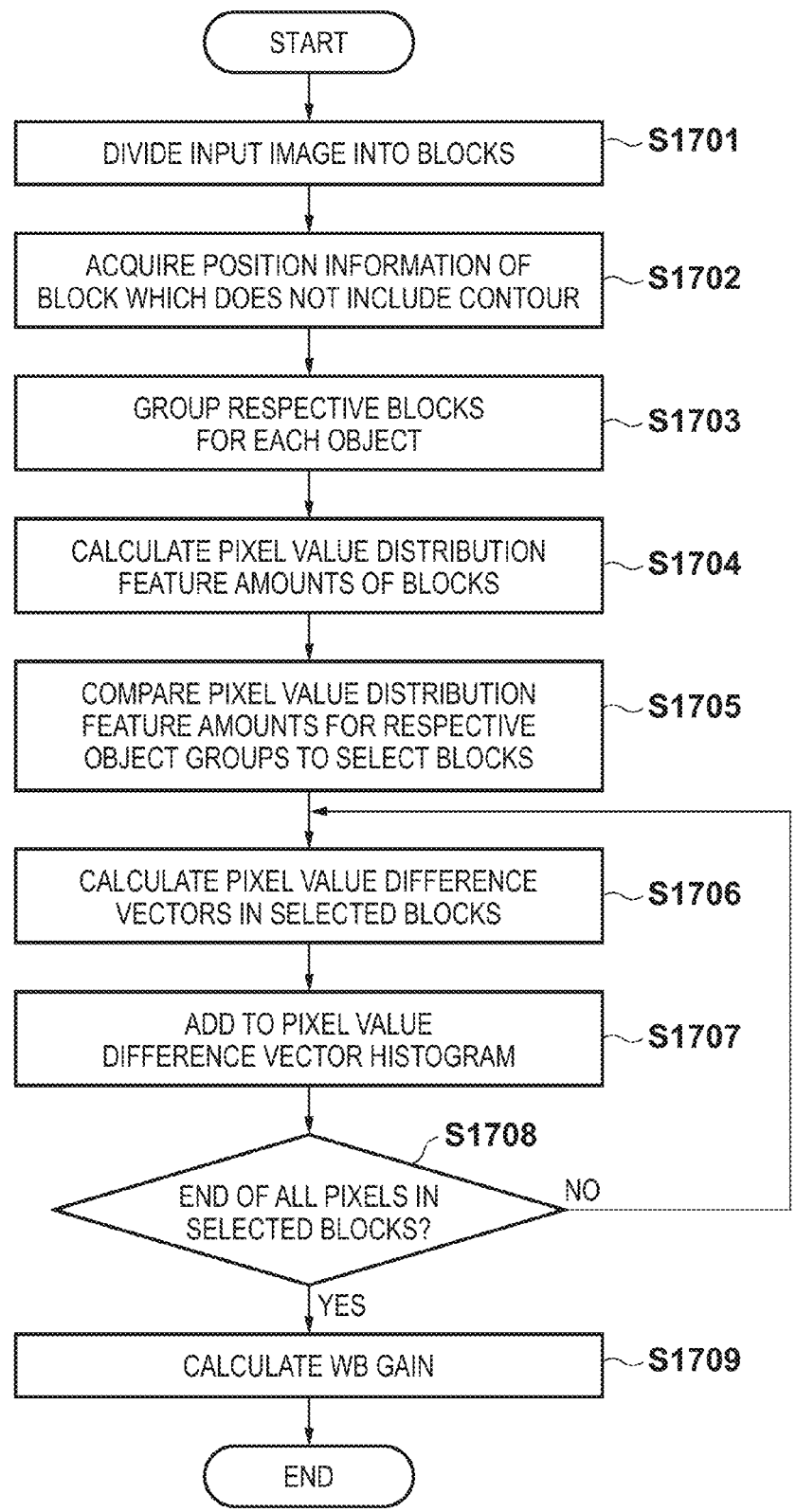
FIG. 17 is a flowchart showing light source estimation processing according to the fifth embodiment.

Processing of the light source estimation unit 106 will be described below with reference to the flowchart shown in FIG. 17.

In step S1701, the light source estimation unit 106 divides an input image into a plurality of blocks as in step S1201 in FIG. 12. The size and positions of blocks are set in the same manner as division in the contour detection unit 1501. In step S1702, the light source estimation unit 106 acquires position information of blocks which do not include any contours from the contour detection unit 1501.

Figure 18:
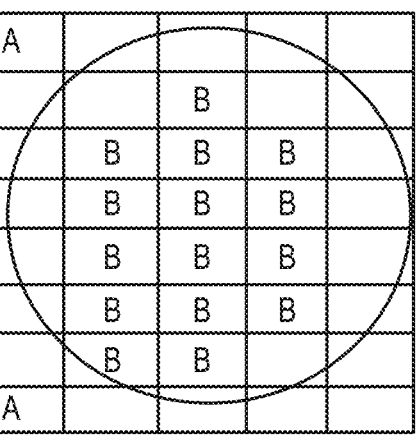
FIG. 18 is a view showing an example of grouping of objects according to the fifth embodiment.

In step S1703, the light source estimation unit 106 groups the respective blocks for respective objects based on the position information acquired in step S1702. FIG. 18 shows an example of a state after grouping. As shown in FIG. 18, grouping is done for respective objects by considering blocks, which do not include any contours and which are adjacent to each other, as those corresponding to a single object. In case of FIG. 18, blocks with "A" are classified as an object group A, those with "B" are classified as an object group B, and those without any letter are classified as blocks which do not belong to any objects.

In step S1704, the light source estimation unit 106 calculates pixel value distribution feature amounts for respective blocks. Since the pixel value distribution feature amount calculation method is the same as that in the case of the fourth embodiment described in step S1202, a detailed description thereof will not be repeated.

In step S1705, the light source estimation unit 106 compares the pixel value distribution feature amounts of respective blocks to extract blocks used in light source estimation as in step S1203. However, in this embodiment, comparison is made between blocks which belong to the same object group, unlike in the fourth embodiment. More specifically, in case of FIG. 18, blocks which belong to the object group A are compared to extract those having top 10% luminance histogram widths as effective blocks. Then, blocks which belong to the object group B are compared to extract those having top 10% luminance histogram widths as effective blocks. The same processing is sequentially executed for respective object groups.

In steps S1706 to S1709, pixel value differences of pixels included in the selected effective blocks are calculated, and a light source color is estimated based on the calculation result, thus calculating a WB gain. The processing contents in these steps are the same as those in case of the fourth embodiment shown in steps S1204 to S1207, and a detailed description thereof will not be given.

As described above, according to this embodiment, an image processing apparatus, which estimates a light source color based on pixel value differences, calculates pixel value distribution feature amounts for respective blocks obtained by dividing an image, and estimates a specular reflection region. In addition, in this embodiment, object contours are detected, and blocks which are estimated to belong to the same object are compared to estimate the specular reflection region. Thus, the specular reflection region can be estimated more accurately. This is because the way the specular reflection region spreads is different for each object since it depends on an illumination state of illumination light and surface characteristics of an object. For example, for an object with a smooth surface, a luminance rise is steep at a boundary of a specular reflection region, while for an object with a rough surface, a luminance rise is slow at a boundary of a specular reflection region. Therefore, by selecting blocks with larger luminance histogram widths from each object group, a region wherein specular reflection is more likely to occur can be extracted independently of an object with a smooth surface or that with a rough surface.

Note that this embodiment has explained the case in which grouping is done for respective objects using contour signals. However, the present invention is not limited to such specific object grouping method. For example, grouping may be done using classification based on color signals in addition to contour signals.

Sixth Embodiment

As the sixth embodiment of the present invention, a case will be described below wherein light source colors are esti-mated for respective regions, and the estimation results are compared to calculate a reliability of light source estimation.

Since the arrangement of an image capturing apparatus according to this embodiment is the same as that of the fourth embodiment shown in FIG. 11, a description thereof will not be repeated.

Figure 19:
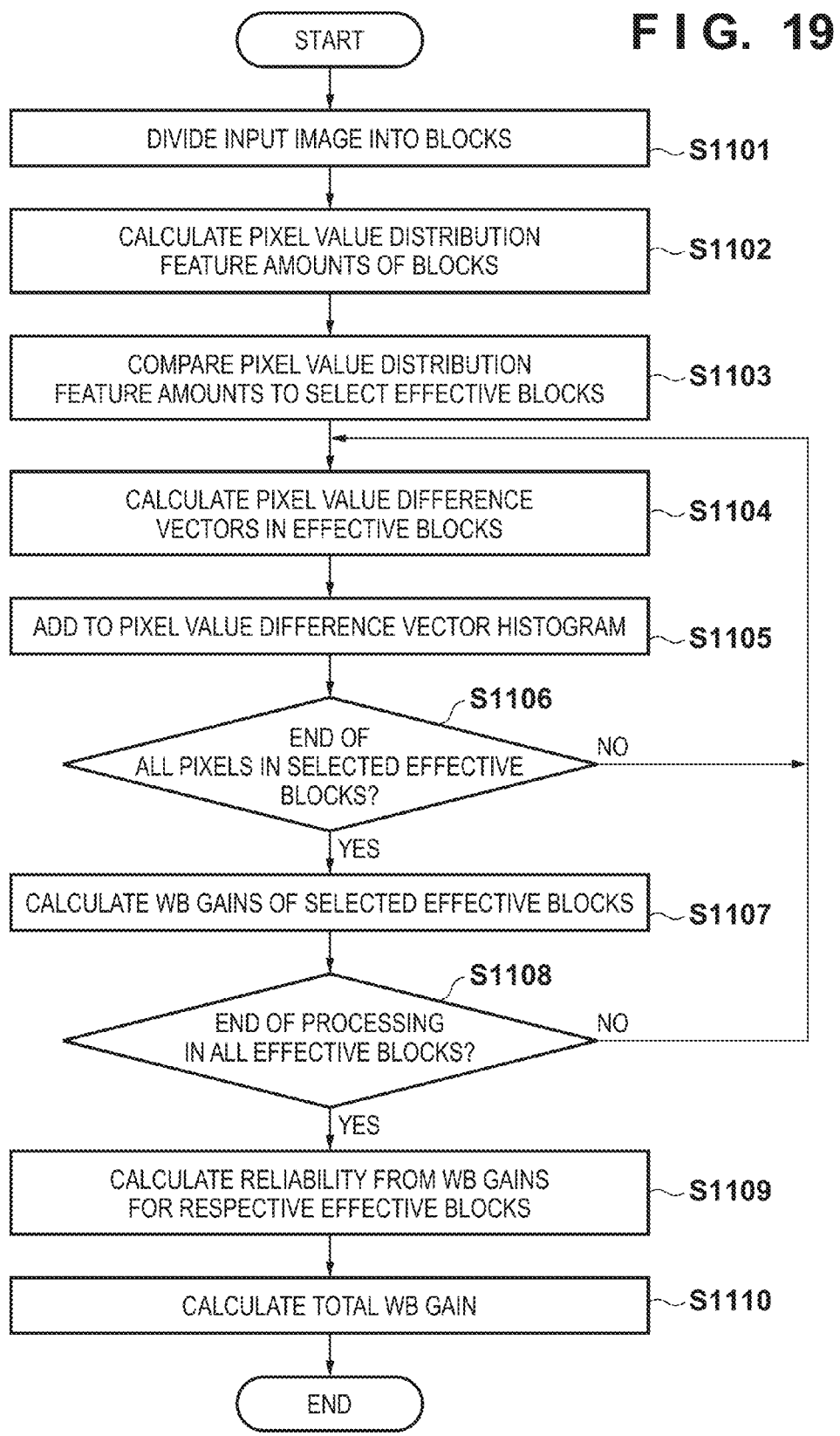
FIG. 19 is a flowchart showing light source estimation processing according to the sixth embodiment.

The sequence of light source estimation processing to be executed by a light source estimation unit 106 according to this embodiment will be described below with reference to the flowchart shown in FIG. 19.

Since a series of processing contents in steps S1101 to S1103 are the same as those in case of the fourth embodiment in steps S1201 to S1203, a description thereof will not be given. In steps S1104 to S1108, pixel value differences are calculated to calculate white balance gains using the same method as in the fourth embodiment. However, in this embodiment, white balance gains are calculated for respective blocks obtained by dividing an input image unlike in the fourth embodiment. More specifically, the white balance gains are calculated as follows.

In step S1104, the light source estimation unit 106 selects one of effective blocks, and calculates pixel value difference vectors for pixels in that block. In step S1105, the light source estimation unit 106 adds the calculated pixel value difference vectors to a pixel value difference vector histogram. The light source estimation unit 106 determines in step S1106 whether or not processing is complete for all pixels in the selected effective block. If the processing is complete, the process advances to step S1107; otherwise, the process returns to step S1104.

In step S1107, the light source estimation unit 106 calculates WB gains from the pixel value difference vectors. The calculation method is the same as that in the first embodiment, but WB gains for each block are calculated in this step unlike in the first embodiment. The light source estimation unit 106 determines in step S1108 whether or not processing is complete for all blocks determined as effective blocks in step S1103. If the processing is complete, the process advances to step S1109; otherwise, the process returns to step S1104 to apply processing to the next block. In step S1109, the light source estimation unit 106 calculates a reliability by comparing the WB gains calculated for respective blocks. The reliability calculation method will be described below with reference to FIGS. 20A and 20B.

Figure 20A:
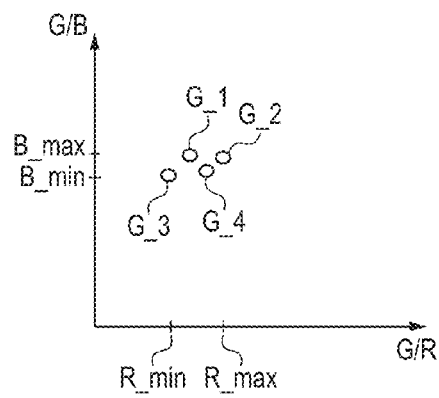
FIGS. 20A and 20B are views for explaining a light source estimation reliability calculation method according to the sixth embodiment.
Figure 20B:
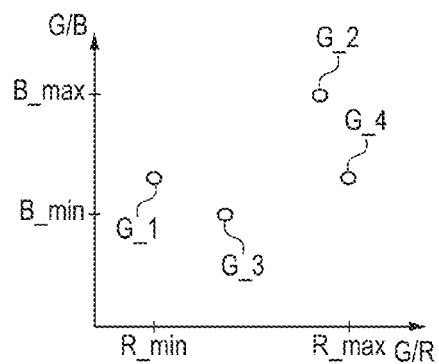

FIGS. 20A and 20B show a case in which four effective blocks are extracted, and WB gains calculated from these effective blocks. FIG. 12A shows a case in which variations of WB gains calculated for respective effective blocks are small, and FIG. 12B show a case in which variations are large. In this case, as variations of WB gains are smaller, a higher reliability of light source estimation is determined. More specifically, the following processing is executed. Let R_Max and R_Min be respectively a maximum value and minimum value of R gains of WB gains of the effective blocks. Likewise, let B_Max and B_Min be respectively a maximum value and minimum value of B gains. Letting P(R) and P(B) be reliabilities of the R and B gains, these reliabilities are calculated by:

$$P(R)=A-(R\_Max-R\_Min)$$

$$P(B)=A-(B\_Max-B\_Min)$$

where A is an appropriate positive constant. The light source estimation unit 106 outputs the calculated reliabilities of the WB gains to the WB correction unit 107.

In step S1110, the light source estimation unit 106 calculates average values of the WB gains calculated from the effective blocks, and outputs the calculation results to the WB correction unit 107 as white balance gains.

The contents of the processing executed by the light source estimation unit 106 have been described.

Processing to be executed by the WB correction unit 107 will be described below. The WB correction unit 107 executes white balance correction based on the WB gains calculated by the light source estimation unit 106. In this case, the WB correction unit 107 limits the WB gain values based on the light source estimation reliabilities. Limitations of the WB gains will be described below with reference to FIG. 21.

Figure 21:
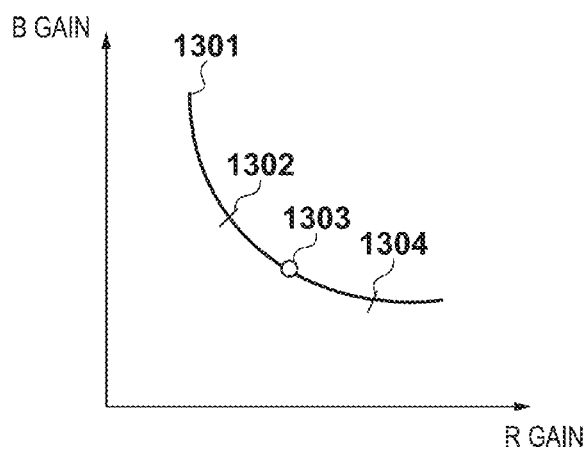
FIG. 21 is a graph showing a WB gain limit according to the sixth embodiment.

In FIG. 21, the ordinate plots a B gain, and the abscissa plots an R gain. Reference numeral 1301 denotes a blackbody radiation axis. The WB gains are controlled to assume values on this axis. Reference numeral 1302 denotes a low color temperature side limit; 1303, a WB gain; and 1304, a high color temperature side limit. In this case, when total WB gains calculated by the light source estimation unit 106 fall outside the limit range, the respective WB gains are controlled so that the total WB gains fall within the limit range.

According to the reliabilities, low (high) color temperature side limit values of the WB gains are controlled. More specifically, when the reliability is low, a low (high) color temperature side limit value is set to be closer to a reference value (for example, a WB gain value under sunlight during the day), so as to prevent the WB gain from largely changing from the reference value. Conversely, when the reliability is high, a low (high) color temperature side limit value is moved to a low (high) color temperature side, and a WB gain calculated by light source estimation is used without being limited.

As described above, according to this embodiment, an image processing apparatus, which estimates a light source color based on pixel value differences, calculates WB gains for respective regions determined that specular reflection has occurred, and compares their values to calculate light source estimation reliabilities. In this manner, even when a specular reflection region is erroneously extracted, the white balance can be prevented from being largely deviated.

Note that this embodiment has explained the case in which WB gains are calculated for respective blocks obtained by dividing an input image, and are compared to calculate reliabilities. However, the present invention is not limited to such specific reliability calculation method. For example, as described in the fifth embodiment, an input image may be divided into object groups, and WB gains may be calculated for respective object groups and may be compared with each other, thus calculating reliabilities.

When light source estimation results estimated from objects having different colors assume values which are close to each other, reliabilities may be calculated to be higher. More specifically, an average hue value is calculated by averaging pixel values of pixels in each effective block, and results from blocks having different average hue values are compared. In this case, when a degree of variation of these values is small, reliabilities may be calculated to be higher.

In this embodiment, reliabilities are calculated by comparing calculated WB gains. However, any other methods may be used as long as they calculate reliabilities based on pixel value difference calculation results. For example, reliabilities may be calculated by comparing peak positions of pixel value difference vectors generated for respective blocks.

Also, this embodiment has explained the method using a difference between maximum and minimum values as the determination method of a degree of variation. However, the present invention is not limited to such specific determination method of a degree of variation. For example, a variance value of WB gains may be calculated and used in determination.

A method of calculating reliabilities according to pixel value distribution feature amounts of respective blocks may be used. For example, widths of luminance histograms of respective blocks are calculated, and as the number of blocks having the calculated widths larger than a predetermined threshold is larger, reliabilities may be calculated to be higher.

Seventh Embodiment

Conventionally, as an auto white balance control function used in a digital camera, a function of adjusting a white balance using an output from an image sensor without using any external sensor has prevailed. As a method of adjusting a white balance using an output from an image sensor, that using a dichromatic reflection model which separates object light into specular reflection components and diffuse reflection components has been proposed.

For example, Japanese Patent No. 4447520 discloses a method of specifying a light source color that illuminates an object by calculating a difference between adjacent pixels having different luminance values. This method is based on the principle which extracts components of a light source color by calculating, from a high-luminance first pixel (including both diffuse reflection components that reflect an object color and specular reflection components that reflect a light source color), a difference of a pixel (diffuse reflection components including only the object color) having a lower luminance value than the first pixel.

More specifically, differences between RGB values of the high-luminance first pixel and those of a second pixel having a lower luminance value than the first pixel are calculated. Since the difference RGB values have the same vector components as the light source color, a white balance gain can be calculated from a component ratio of the difference RGB values.

In order to calculate the light source color from a difference between a pixel of a specular reflection component and that of a diffuse reflection component, a pixel including a specular reflection component (and diffuse reflection component) and that including a diffuse reflection component have to be acquired from a single object and from a region having the same object color. Japanese Patent No. 4447520 estimates a light source color using a difference between adjacent pixels having different luminance values under the assumption that adjacent pixels are likely to belong to the same object (and to have the same object color).

However, since different objects may be located to be adjacent to each other, and since even a single object may have different colors depending on regions, adjacent pixels are not always pixels of the same object and the same object color. Since the related art disclosed in Japanese Patent No. 4447520 considers only adjacency of pixels, there is room for improvement in estimation accuracy of a color temperature of a light source even when error suppression processing (for example, processing for averaging a plurality of detection results) is executed. Embodiments to be described hereinafter cope with such problems.

Figure 22:
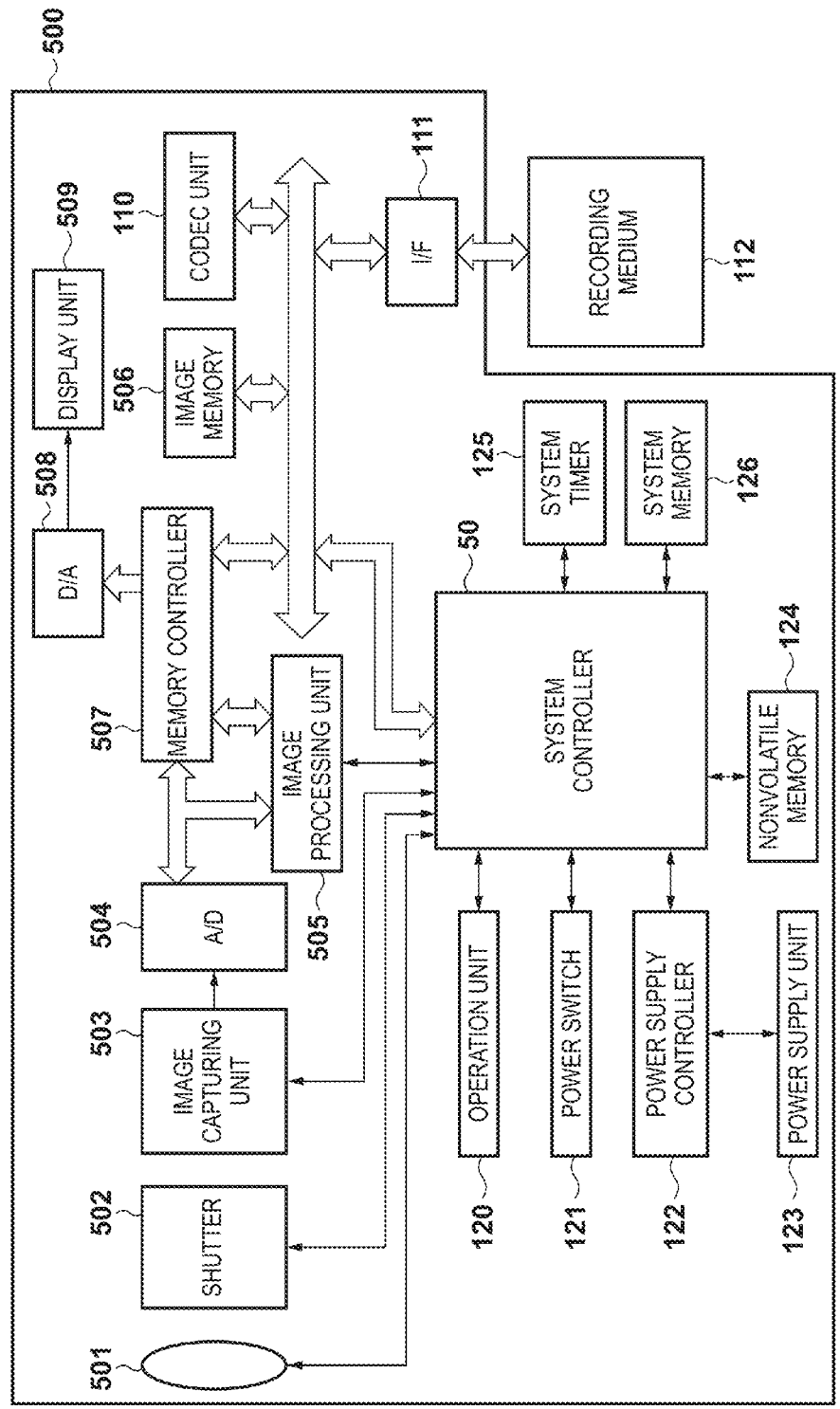
FIG. 22 is a block diagram showing an example of the arrangement of a digital camera as an example of an image processing apparatus according to the seventh embodiment.

FIG. 22 is a block diagram showing an example of the arrangement of a digital camera 100 according to the seventh embodiment.

Referring to FIG. 22, a lens group 501 corresponds to a zoom lens unit including a focus lens. A shutter 502 including a stop function is arranged between the lens group 501 and an image capturing unit 503. The image capturing unit 503 has an image sensor represented by a CCD/CMOS image sensor, which converts an optical image formed on an image capturing surface by the lens group 501 into electrical signals for respective pixels. An A/D converter 504 converts analog signals output from the image capturing unit 503 into digital signals (image data).

An image processing unit 505 applies various kinds of image processing such as color interpolation (demosaicing), white balance adjustment, γ correction, edge emphasis, noise reduction, and color correction to image data output from the A/D converter 504. An image memory 506 temporarily stores image data. A memory controller 507 controls read and write accesses to the image memory 506. A D/A converter 508 converts an image signal into analog signals. A display unit 509 has a display device such as an LCD or organic EL display, and displays various GUIs, a live view image, an image which is read out from a recording medium 112 and is played black, and the like. A codec unit 110 encodes image data stored in the image memory 506 by a predetermined method so as to record that data in the recording medium, and decodes encoded image data included in an image file for the purpose of, for example, display.

An interface (I/F) 111 mechanically and electrically connects the recording medium 112 (for example, a semiconductor memory card or card type hard disk) to the digital camera 100. A system controller 50 may be, for example, a programmable processor such as a CPU or MPU. The system controller 50 executes programs recorded in, for example, a nonvolatile memory 124 or an internal nonvolatile memory to control required blocks and circuits, thereby implementing functions of the digital camera 100 such as light source estimation processing (to be described later).

An operation unit 120 includes buttons, switches, and the like, which are used by the user to input various instructions to the digital camera 100, and are described together. A power switch 121 is one of switches included in the operation unit 120, and is described as a different block for the purpose of convenience. A power supply controller 122 includes a battery detection circuit, DC-DC converter, switch circuit required to switch a block to be energized, and the like, and detects information such as the presence/absence, type, battery remaining amount, and the like of a device in association with a power supply unit 123 as a rechargeable battery. Also, the power supply controller 122 controls the DC-DC converter based on the detection results associated with the power supply unit 123 and an instruction from the system controller 50, so as to supply required voltages to respective units of the digital camera 100 including the recording medium 112 for a required period.

The nonvolatile memory 124 may be an electrically erasable/recordable memory (for example, an EEPROM). The nonvolatile memory 124 records various setting values and GUI data, and also programs when the system controller 50 is an MPU or CPU.

A system timer 125 measures time periods used in various kinds of control and a time of an internal clock. A system memory 126 is, for example, a volatile memory, which is used to store constants and variables required for operations of the system controller 50 and to expand programs and the like read out from the nonvolatile memory 124.

Operations of the digital camera 100 at an image capturing timing will be described below.

For example, the image capturing unit 503 photoelectrically converts, using the image sensor, an object image formed on the image capturing surface by the lens group 501 when the shutter 502 is opened, and outputs photoelectric conversion results to the A/D converter 504 as analog image signals. The A/D converter 504 converts the analog image signals output from the image capturing unit 503 into digital image signals (image data), and outputs the image data to the image processing unit 505.

The image processing unit 505 applies various kinds of image processing such as color interpolation (demosaicing), γ correction, edge emphasis, noise reduction, and color correction to the image data from the A/D converter 504 or the memory controller 507.

Also, the image processing unit 505 executes predetermined arithmetic processing associated with luminance, contrast, and the like based on the image data obtained by the image capturing operation, and the system controller 50 executes ranging control and exposure control based on the obtained arithmetic results. In this manner, the digital camera 100 of this embodiment executes TTL (Through-The-Lens) AF (Auto Focus) processing and AE (Auto Exposure) processing. The image processing unit 505 further estimates a light source color which illuminates an object at the image capturing timing using the image data obtained by the image capturing operation, and also executes auto white balance (AWB) adjustment based on the estimated light source color. Details of the light source color estimation processing will be described later.

The image data output from the image processing unit 505 is written in the image memory 506 via the memory controller 507. The image memory 506 stores image data output from the image capturing unit 503 and that to be displayed on the display unit 509.

The D/A converter 508 converts image display data stored in the image memory 506 into analog signals, and supplies the analog signals to the display unit 509. The display unit 509 displays an image on a display device such as an LCD according to the analog signals from the D/A converter 508.

The codec unit 110 encodes image data recorded in the image memory 506 based on standards such as JPEG and MPEG. The system controller 50 gives a predetermined header and the like to encoded image data to form an image file, and records the image file in the recording medium 112 via the interface 111.

Note that it is a common practice for a current digital camera to make a moving image capturing operation in an image capturing standby state, and to continuously display the captured moving image on the display unit 509, thereby controlling the display unit 509 to function as an electronic viewfinder (EVF). In this case, the shutter 502 is opened, and an image capturing operation is executed at, for example, 30 frames/sec using a so-called electronic shutter of the image capturing unit 503.

Then, when the user presses a shutter button included in the operation unit 120 to a half-stroke position, the aforementioned AF control and AE control are executed. When the user presses the shutter button to a full-stroke position, a main image capturing operation of a still image to be recorded is executed, and the captured still image is recorded in the recording medium 112. When the user instructs a moving image capturing operation using a moving image capturing button or the like, a moving image recording operation in the recording medium 112 is started.

FIG. 23 is a block diagram showing an example of the functional arrangement of the image processing unit 505.

Image data output from the A/D converter 504 in FIG. 22 is input to a luminance/color signal generator 200. The image data has a value corresponding to one of color components which form a color filter included in the image sensor. When a primary color filter of a Bayer matrix, which is used in general, is used, image data includes data of R, G, and B pixels.

The luminance/color signal generator 200 applies demosaicing processing to such image data, and generates a luminance signal Y and color signals R, G, and B for each pixel. The luminance/color signal generator 200 outputs the generated color signals R, G, and B to a white balance (WB) amplifier 201 and the luminance signal Y to a luminance γ processor 205. Also, the luminance/color signal generator 200 outputs the color signals R, G, and B as image data (RGB) to the image memory 506 via the memory controller 507.

The color signals R, G, and B generated by the luminance/color signal generator 200 are also input to a color space conversion processor 207. The color space conversion processor 207 converts the color signals R, G, and B into a luminance Y and color differences (R−Y)/Y and (B−Y)/Y, and outputs them as image data (YUV) to the image memory 506 via the memory controller 507.

The WB amplifier 201 applies gains to the color signals R, G, and B based on white balance gain values calculated by the system controller 50 by processing (to be described later), thus adjusting a white balance. A color γ processor 202 applies gamma correction to the color signals R, G, and B. A color difference signal generator 203 generates color difference signals R-Y and B-Y from the color signals R, G, and B, and outputs these signals to a color correction unit 204. The color correction unit 204 applies gains to the color difference signals R-Y and B-Y to adjust a hue and saturation. The color correction unit 204 outputs the corrected color difference signals R-Y and B-Y to the image memory 506 via the memory controller 507.

On the other hand, the luminance γ processor 205 applies gamma correction to the luminance signal Y, and outputs the corrected signal to an edge emphasis processor 206. The edge emphasis processor 206 applies edge emphasis processing to the luminance signal Y, and outputs the processed signal to the image memory 506 via the memory controller 507. The luminance signal Y output from the edge emphasis processor 206 and the color difference signals R-Y and B-Y output from the color correction unit 204 are encoded by the codec unit 110, and are finally recorded in the recording medium 112.

The light source estimation processing according to this embodiment will be described below with reference to the flowcharts shown in FIGS. 24A and 24B. In the light source estimation processing, the system controller 50 estimates components of a light source color from signals which are output from the luminance/color signal generator 200 of the image processing unit 505 to the image memory 506.

Figure 24A:
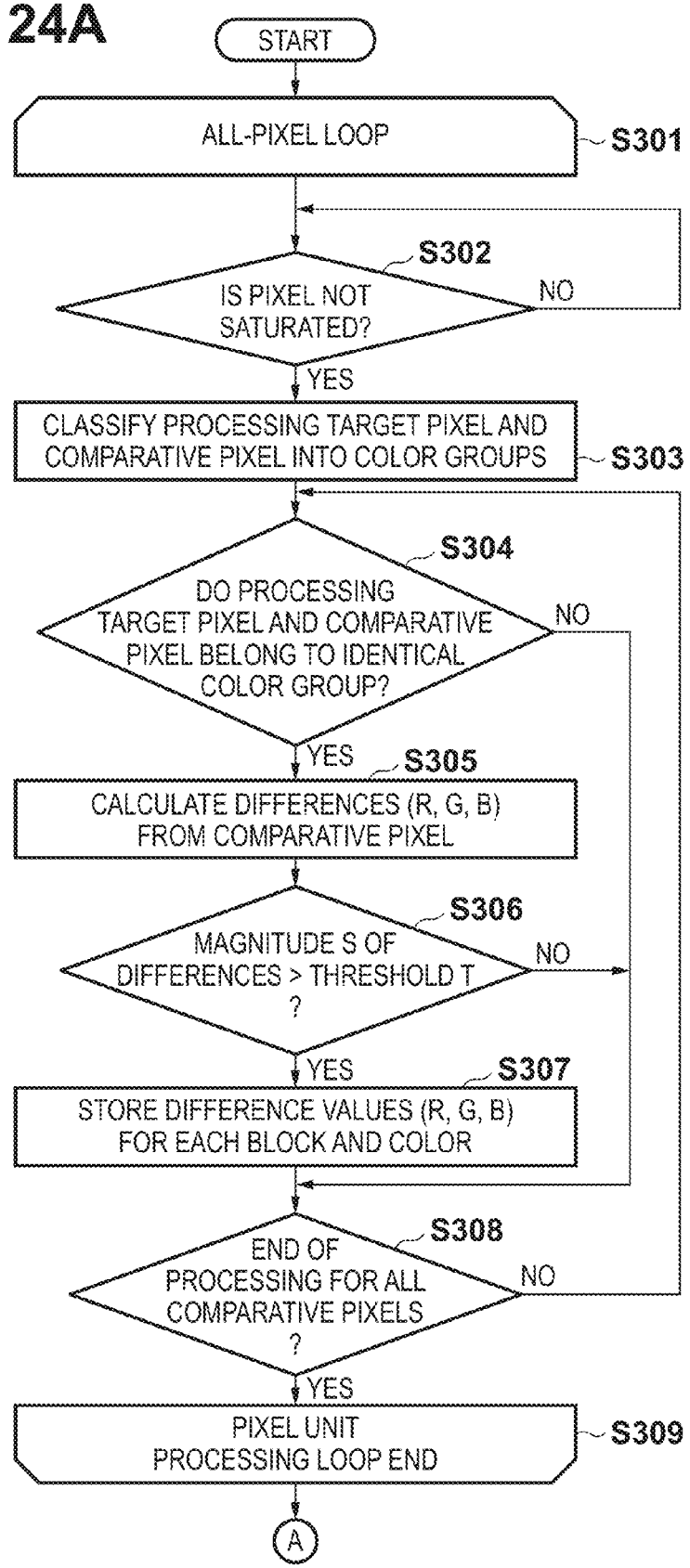

Referring to FIGS. 24A and 24B, steps S301 and S309 indicate that processes of steps S302 to S308 are executed for all pixels while raster-scanning a target pixel.

The system controller 50 confirms in step S302 if a processing target pixel is not saturated. More specifically, the system controller 50 respectively compares R, G, and B components with a predetermined threshold. If a component larger than the threshold is found, the system controller 50 judges that the pixel is saturated, and selects the next pixel as a processing target pixel to confirm saturation. On the other hand, if all of R, G, and B components are not more than the threshold, the system controller 50 judges that the pixel is not saturated, and the process advances to step S303.

Figure 25A:
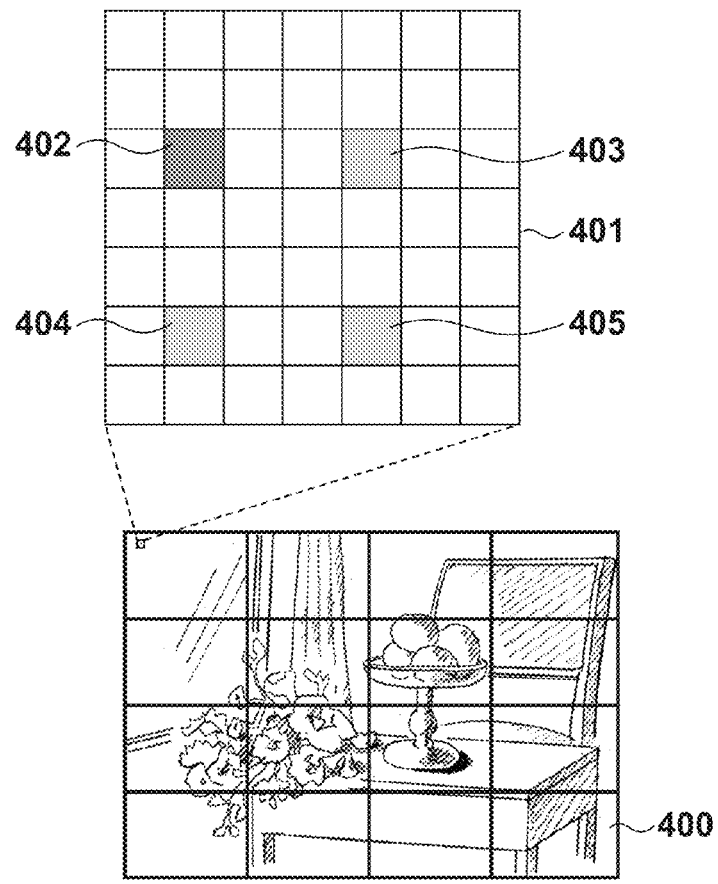
FIGS. 25A and 25B are views showing an example of an input image according to the seventh embodiment.

In step S303, the system controller 50 as a classification unit classifies the processing target pixel and comparative pixels into a plurality of color groups. The processing target pixel and comparative pixels will be described below with reference to FIG. 25A. In FIG. 25A, reference numeral 400 denotes an input image; and 401, an illustration of a partially enlarged state of the input image 400. Meshes in the illustration 401 indicate borders of pixels. Reference numeral 402 denotes a processing target pixel in the current processing. The processing shown in FIGS. 24A and 24B is executed for each pixel while sequentially raster-scanning a position of the processing target pixel 402. Reference numerals 403, 404, and 405 denote comparative pixels with respect to the processing target pixel 402. In this embodiment, a plurality of pixels at positions spaced apart from the processing target pixel 402 by a predetermined distance (the number of pixels) in predetermined directions are used as comparative pixels.

A positional relationship to be satisfied by the processing target pixel and comparative pixels can be set in advance. However, basically, pixels located at a plurality of positions adjacent to the processing target pixel are used as comparative pixels. In this case, for example, in a 4×4 pixel block having the processing target pixel as a pixel at the upper left corner, those at the remaining three corners are used as comparative pixels. When a distance between the processing target pixel and each comparative pixel is too small, an inter-pixel difference may be reduced; when the distance is too large, these pixels may not correspond to a single object. Therefore, a distance is experimentally set within a range of, for example, about several to 10 pixels. Note that the positional relationship between the processing target pixel and comparative pixels may be appropriately changed when the processing target pixel is located at an end portion of an input image.

Figure 26:
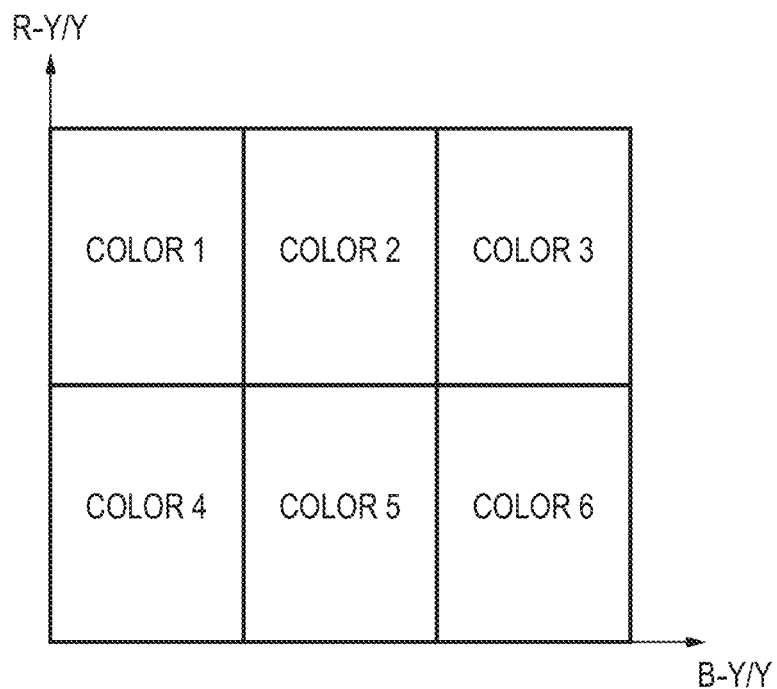
FIG. 26 is a view showing an example of color groups according to the seventh embodiment.

In step S303, the system controller 50 classifies the processing target pixel 402 and comparative pixels 403 to 405 into predetermined color groups. Note that the color groups correspond to groups of colors of close regions on a color difference plane. FIG. 26 shows an example of color groups defined on the color difference plane. In the example of FIG. 26, the color difference plane is divided into six regions, which are respectively classified into color groups 1 to 6. In step S303, the system controller 50 acquires color difference values (R−Y)/Y and (B−Y)/Y of the processing target pixel 402 and comparative pixels 403 to 405 from the image memory 506, and determines color groups to which respective pixels belong, thus classifying the pixels into color groups. Note that the classification/determination method is an example, and other methods may be used. For example, groups may be set by dividing hue and saturation values. When a saturation value is used, an achromatic color is excluded.

Referring back to FIG. 24A, the processes of steps S304 to S307 to be repetitively executed for all the comparative pixels 403 to 405 will be explained. The description will be given first taking the comparative pixel 403 as an example.

The system controller 50 determines in step S304 whether or not the processing target pixel 402 and comparative pixel 403 belong to the same color group. If these pixels belong to the same color group, the process advances to step S305; otherwise, the process jumps to step S308.

In step S305, the system controller 50 calculates a difference between the processing target pixel 402 and comparative pixel 403. That is, the system controller 50 calculates differences subR, subG, and subB between RGB values R1, G1, and B1 of the processing target pixel 402 and RGB values R2, G2, and B2 of the comparative pixel 403.

The system controller 50 determines in step S306 whether or not a magnitude S of the differences subR, subG, and subB calculated in step S305 is larger than a predetermined threshold T (T<S). The magnitude S of the differences subR, subG, and subB is calculated by:

$$S=\sqrt{\{(subR)^2+(subG)^2+(subB)^2\}}$$

If the system controller 50 determines that the magnitude S of the differences is larger than the threshold T, the process advances to step S307; otherwise, the process jumps to step S308.

In step S307, the system controller 50 stores (adds) the differences subR, subG, and subB between the processing target pixel and the comparative pixel in the system memory 126. FIG. 27 shows an example of the storage format of the differences subR, subG, and subB. In this embodiment, when the magnitude S of the differences is larger than the threshold T, the differences subR, subG, and subB are totaled for respective color components, and for each block and color group to which the processing target pixel belongs, as shown in FIG. 27.

Note that the block in this step indicates a divided region of an input image, and FIG. 25A shows an example of the input image 400 which is divided into 16 (=4 (horizontal direction)×4 (vertical direction)). The differences subR, subG, and subB calculated for pixels included in each partial region of the input image in this way are totaled for each of color groups 1 to 6 to obtain difference values which represent that group (color group difference values). Every time the differences subR, subG, and subB are added, a count value associated with the total values is incremented by "1". Therefore, the count value indicates the number of difference values used in calculation of the color group difference values.

Note that the reason why the differences subR, subG, and subB are totaled only when the magnitude S of the differences is larger than the threshold T in steps S306 and S307 is to extract only difference values which are considered to have a large degree indicating a color feature of a light source. This reason will be described in more detailed below with reference to FIG. 25B and FIGS. 28A and 28B.

Figure 25B:
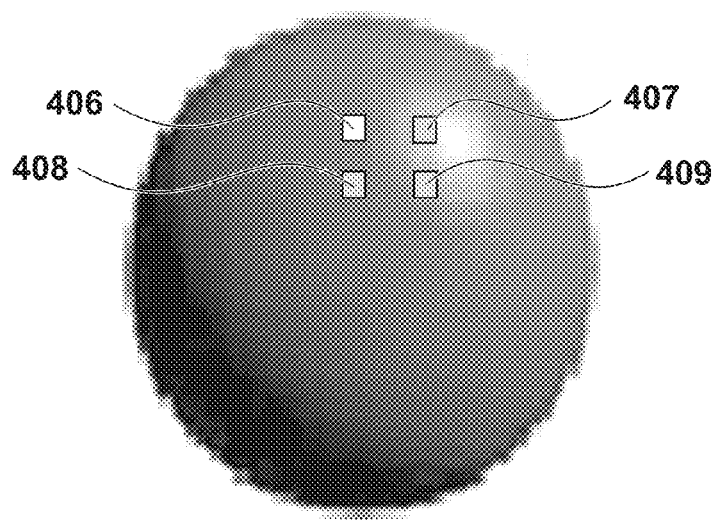

FIG. 25B shows an image of an object including specular reflection, and a processing target pixel 406 and comparative pixels 407 to 409. Assume that the high-luminance comparative pixels 407 and 409 include relatively many specular reflection components, and the processing target pixel 406 and comparative pixel 408 include nearly diffuse reflection components alone.

Figure 28A:
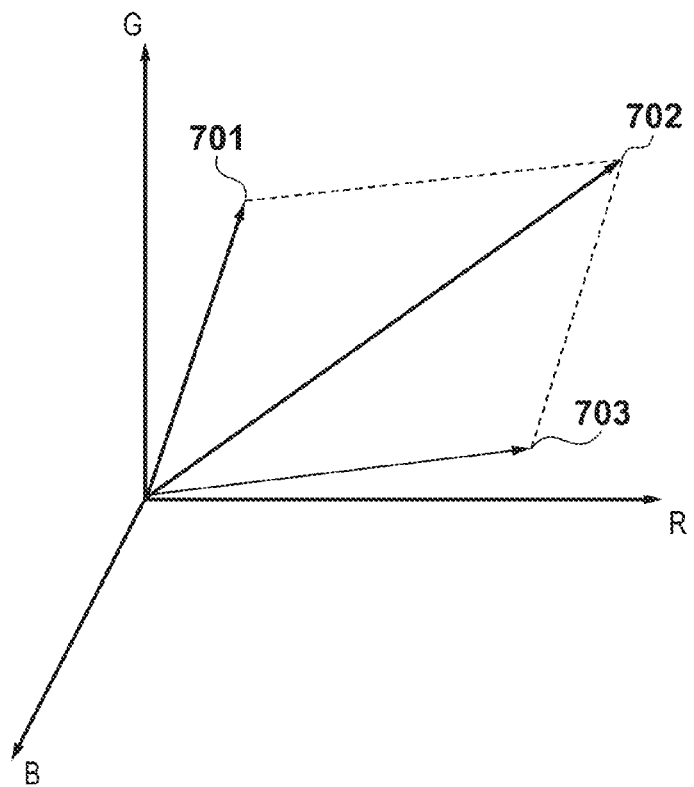
FIGS. 28A and 28B are views showing a light source color estimation method according to the seventh embodiment.

FIG. 28A illustrates an example of the relationship between specular reflection components and diffuse reflection components included in a pixel on an RGB color space. On the RGB space, RGB values of a certain pixel can be expressed by a vector from an origin to coordinates corresponding to the RGB values. Assume that a vector 701 expresses a case in which RGB values include only an object color (diffuse reflection components), and a vector 702 expresses a case in which RGB values include an object color (diffuse reflection components) and light source color (specular reflection components). In this case, a vector 703 which expresses RGB values of a light source color (specular reflection components) to be obtained can be calculated as a difference vector between the vectors 702 and 701. Note that since a starting point of each vector is a coordinate origin, RGB values calculated as differences between the coordinates are those of the light source in practice. Therefore, differences between the RGB values of the pixel including only the object color and those of the pixel including the object color and light source color can be obtained as those of the light source color. In the example shown in FIG. 25B, differences between the RGB values of the processing target pixel 406 and the comparative pixel 407 or 409 are calculated as estimated values of RGB values of the light source color.

On the other hand, since diffuse reflection components are dominant in both the processing target pixel 406 and comparative pixel 408 in FIG. 25B, RGB values of these pixels are close to those expressed by the vector 701 in the example of FIG. 28A. For example, in FIG. 28B, assuming that RGB values of the processing target pixel 406 and comparative pixel 408 are respectively expressed by vectors 711 and 712, differences of the RGB values assume very small values. Although not shown, likewise, since both the comparative pixels 407 and 409 have diffuse reflection components and specular reflection components, and their RGB values are expressed by vectors similar to the vector 702, differences between the RGB values also assume very small values.

Figure 28B:
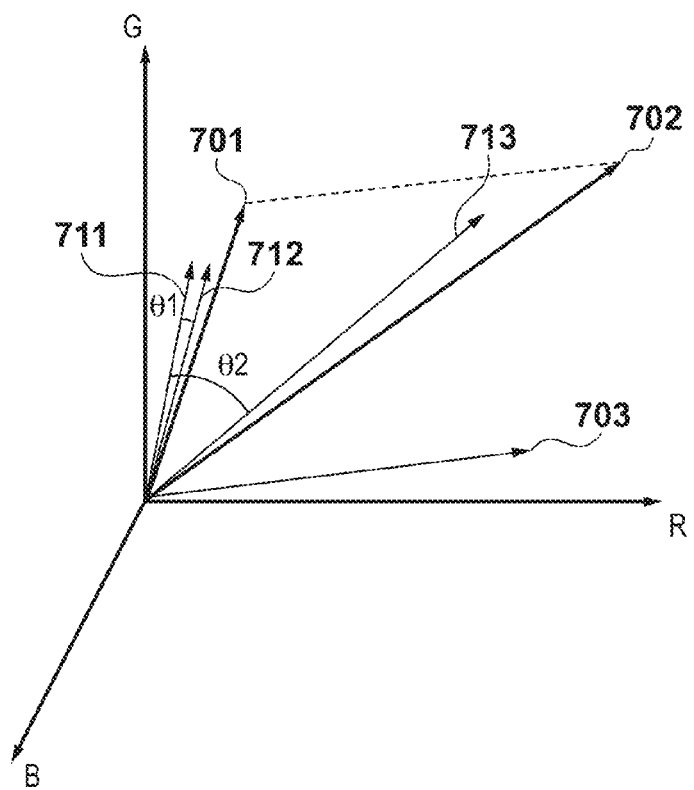

Assuming that the RGB values of the comparative pixel 407 are expressed by a vector 713 in FIG. 28B, differences between the vector 711 corresponding to the RGB values of the processing target pixel 406 and the vector 713 corresponding to the RGB values of the comparative pixel 407 are large. Since the differences correspond to a vector close to the RGB values of the light source color, they are to be extracted.

In this manner, when the magnitude S of the differences of the RGB values of pixels is small, these pixels normally have similar reflection components and a contribution of characteristics of the light source in the difference values is small. Hence, such differences are not used in estimation of the light source color in this embodiment. For this purpose, the threshold T is set, and only when the magnitude S of the differences is larger than the threshold T, the differences subR, subG, and subB are totaled for respective color components in the system memory 126.

Referring back to FIG. 24A, the system controller 50 confirms in step S308 whether or not the processes of steps S304 to S307 are complete for all the comparative pixels 403 to 405. As shown in FIG. 25A, there are the three comparative pixels 403, 404, and 405 with respect to one processing target pixel 402 in this embodiment. For this reason, determination of a color group to which the pixels belong (step S304) and difference calculations (step S305) are executed for all the comparative pixels. If the magnitude S of the differences is larger than the threshold T, the differences subR, subG, and subB are totaled in the system memory 126.

The processes of steps S302 to S308 described above are executed for all pixels of the input image while raster-scanning the processing target pixel.

Upon completion of counting of difference values for all the pixels of the input image by the processes until step S309, the system controller 50 calculates total difference values for respective blocks in steps S310 to S312.

More specifically, in step S311, the system controller 50 calculates total difference values for each block in which the differences are totaled. The total difference value calculation method will be described below with reference to FIG. 27. FIG. 27 shows an example of color group difference values obtained by totaling the differences subR, subG, and subB between the processing target pixel and comparative pixel for respective color components for respective blocks and respective color groups, as described above.

In step S311, the system controller 50 calculates one difference value which represents each block as a total difference value. The system controller 50 refers to count values of color groups 1 to 6, and selects a color group with a maximum count value. Therefore, the system controller 50 selects color group 1 (color 1) in case of block 1 of FIG. 27, and selects color group 4 (color 4) in case of block 2. Next, the system controller 50 divides the color components of the color group difference values R, G, and B of the selected color group by the count value of that color group to calculate average difference values. Average difference values BlockSub_R, BlockSub_G, and BlockSub_B obtained in this way are used as total difference values of that block. The total difference values express a vector (RGB values of the light source color) of specular reflection components (light source components) obtained by each block.

The reason why the color group with the maximum count value is selected is to suppress the influence of noise. Since a color group with a small count value is susceptible to noise, the influence of noise is suppressed by attaching importance to a color group which has a large count value in the block and has a dominant feature in the group.

After the calculations of the total difference values BlockSub$_{13}$ R, BlockSub_G, and BlockSub_B in step S311 are executed for all the 16 blocks, the system controller 50 advances the process to step S313.

In step S313, the system controller 50 calculates average total difference values aveR, aveG, and aveB as average values of the total difference values calculated for the 16 blocks.

In step S314, the system controller 50 calculates white balance gains from the average total difference values aveR, aveG, and aveB. In this step, if a G white balance gain G Gain assumes a predetermined fixed value, R and B white balance gains R Gain and B Gain are respectively calculated by:

$$R\ \text{Gain} = (\text{ave}G/\text{ave}R) * G\ \text{Gain}$$

$$B\ \text{Gain} = (\text{ave}G/\text{ave}B) * G\ \text{Gain}$$

In step S315, the system controller 50 sets the calculated white balance gains in the WB amplifier 201. The WB amplifier 201 executes amplifying processing of input RGB values based on the set white balance gains.

As described above, according to this embodiment, input pixels are classified into a plurality of color groups, and a light source color is estimated from difference values calculated between adjacent pixels which belong to the same color group (having a similar color). Using difference values between adjacent pixels which belong to the same color group, differences between two pixels which correspond to identical color portions of the same object are more likely to be acquired, thus enhancing extraction accuracy of specular reflection components (=light source components), that is, estimation accuracy of the light source color.

Note that upon calculations of the total difference values BlockSub_R, BlockSub_G, and BlockSub_B of each block, average difference values of the color group with the maximum count value are used as total difference values. However, other values may be used as total difference values. For example, higher weights are used as count values are larger, and weighted average values of the average difference values of a plurality of color groups may be used as the total difference values. Also, average values of the average difference values of a plurality of predetermined color groups selected in descending order of count value may be used as the total difference values of the block. That is, the total difference values can be calculated by arbitrary methods using difference values of color groups with larger count values.

The total difference values may be generated from difference values of color groups which are selected based on a condition other than a count value. For example, the total difference values may be generated using a luminance average value, color variance value, or the like for each color group. For example, the average difference values of a color group having a largest average luminance value of pixels which belong to that group or a color group having a smallest color variance value of pixels which belong to that group can be used as the total difference values. Alternatively, weighted average values of difference values of a plurality of groups may be calculated according to their average luminance values or color variance values, and may be used as the total difference values.

Since a color group having a higher average luminance value tends to reflect specular reflection, the total difference values are calculated by attaching importance on difference values of color groups having higher average luminance values, thus enhancing estimation accuracy of a light source color. Also, since a small color variance value indicates small variations of an object color, and variations of light source color estimation results become also small, the total difference values are calculated by attaching importance on difference values of color groups having smaller color variance values, thus enhancing estimation accuracy of a light source color.

Also, this embodiment judges whether or not a combination of the processing target pixel and comparative pixel is suited to extraction of specular reflection components by checking whether or not the magnitude S of the difference values is larger than the predetermined threshold T. However, such judgment may be done by other methods.

For example, an angle θ vectors of the processing target pixel and comparative pixel make may be calculated, and when the angle θ is smaller than a predetermined threshold, it may be determined that a combination of these pixels is not suited to sufficient extraction of specular reflection components, and their differences may not be totaled. This method will be described in detail below with reference to FIG. 28B. As described above, in FIG. 28B, the vector 701 expresses the object color (diffuse reflection components), the vector 702 expresses the object color and light source color (diffuse reflection components+specular reflection components), and the vector 703 expresses the light source color (specular reflection components). Also, the vector 711 expresses a pixel value of the processing target pixel 406 in FIG. 25B, the vector 712 expresses a pixel value of the comparative pixel 408, and the vector 713 expresses a pixel value of the comparative pixel 407.

In this case, a difference vector between the vector 713 which expresses the object color+light source color and the vector 711 or 712 which expresses the object color is to be calculated for estimation of the light source color.

Hence, angles θ of the vector 711 of the processing target pixel 406 and the vectors 712 and 713 of the comparative pixels 408 and 407 make are calculated. Let θ1 be the angle θ the vectors 711 and 712 make, and θ2 be the angle θ the vectors 711 and 713 make. Components of the light source color to be calculated correspond to differences between vectors having different reflected light components. Hence, it is judged that differences between pixels for which the angle θ vectors of their pixel values make is smaller than the predetermined threshold are those of pixels having identical or similar reflected light components, and are not totaled. With this method, extraction accuracy of light source components (specular reflection components), that is, estimation accuracy of the light source color can be enhanced like in comparison between the magnitude S of differences and the threshold T.

This embodiment has exemplified the case in which an input image is divided into 4 in both the horizontal and vertical directions, that is, into 16 blocks. However, the block division method and the number of divisions are not particularly limited. For example, an input image may be divided into 16 or more blocks, or the entire image may be handled as one block. Also, blocks need not have the same size.

This embodiment has exemplified the case in which an input image is raster-scanned to apply the difference calculation processing to all pixels. However, differences need not always be calculated from all the pixels, and the processing target pixel may be intermittently scanned.

In this embodiment, white balance gains are calculated from image signals before application of the white balance gains in the WB amplifier 201. Alternatively, white balance gains may be calculated from other image signals. For example, image signals Y, R−Y, and B−Y after white balance adjustment, which signals are output from the image processing unit 505, may be converted into RGB values, and white balance gains may be calculated from differences between pixels as in the above description. In this case, slight white balance deviations of an image after white balance adjustment can be corrected.

Also, when pixels are classified into color group, an image after white balance adjustment may be used, and when differences between pixels are calculated, that before white balance adjustment may be used. Pixels can be easily classified into color groups since the image after white balance adjustment suffers less color deviations due to the sensitivity of the image sensor or the like. On the other hand, upon extracting light source color components (specular reflection components) from differences between pixels, errors can be reduced since differences become large in the image before white balance adjustment. Hence, pixels are classified into color groups based on pixel values to which temporary white balance gains are applied, and pixel difference values are calculated from differences of pixel values to which no white balance gain is applied for respective color groups, thus enhancing estimation accuracy of a light source color more.

This embodiment has exemplified the case in which total difference values are calculated for respective blocks, and those for the entire image are calculated from the total difference values for respective blocks. However, light source colors may be estimated for respective blocks from the total difference values for respective blocks, and white balance gains may be calculated for respective blocks. Thus, a white balance can be controlled for each region of an image, and white balance adjustment can be accurately applied to, for example, an object obtained in an environment including a plurality of light sources.

In this embodiment, color spaces (R−Y)/Y and (B−Y)/Y are used as color differences which define each color group. Alternatively, color groups may be defined by other color spaces (for example, an L*a*b* space).

Eighth Embodiment

The eighth embodiment will be described below. The seventh embodiment has explained the method of estimating a light source color from differences which are judged to be suitable for estimation of the light source color of those between pixels having similar colors. By contrast, the eighth embodiment estimates a light source colors from differences between pixels having similar colors and luminance differences which are judged to be suitable for estimation of the light source color.

Since this embodiment can be practiced in a digital camera 100 described in the seventh embodiment, a description about the arrangement of the digital camera 100 will not be given, and light source color estimation processing unique to this embodiment will be described below with reference to the flowcharts shown in FIGS. 29A and 29B.

As in the seventh embodiment, assume that RGB signals output from a luminance/color signal generator 200 of an image processing unit 505 and Y, (R−Y)/Y, and (B−Y)/Y signals output from a color space conversion processor 207 are recorded in an image memory 506.

A system controller 50 loads image signals from this image memory 506, estimates a light source color by executing the following processing, and calculates white balance gains.

Figures 29A, 29B:
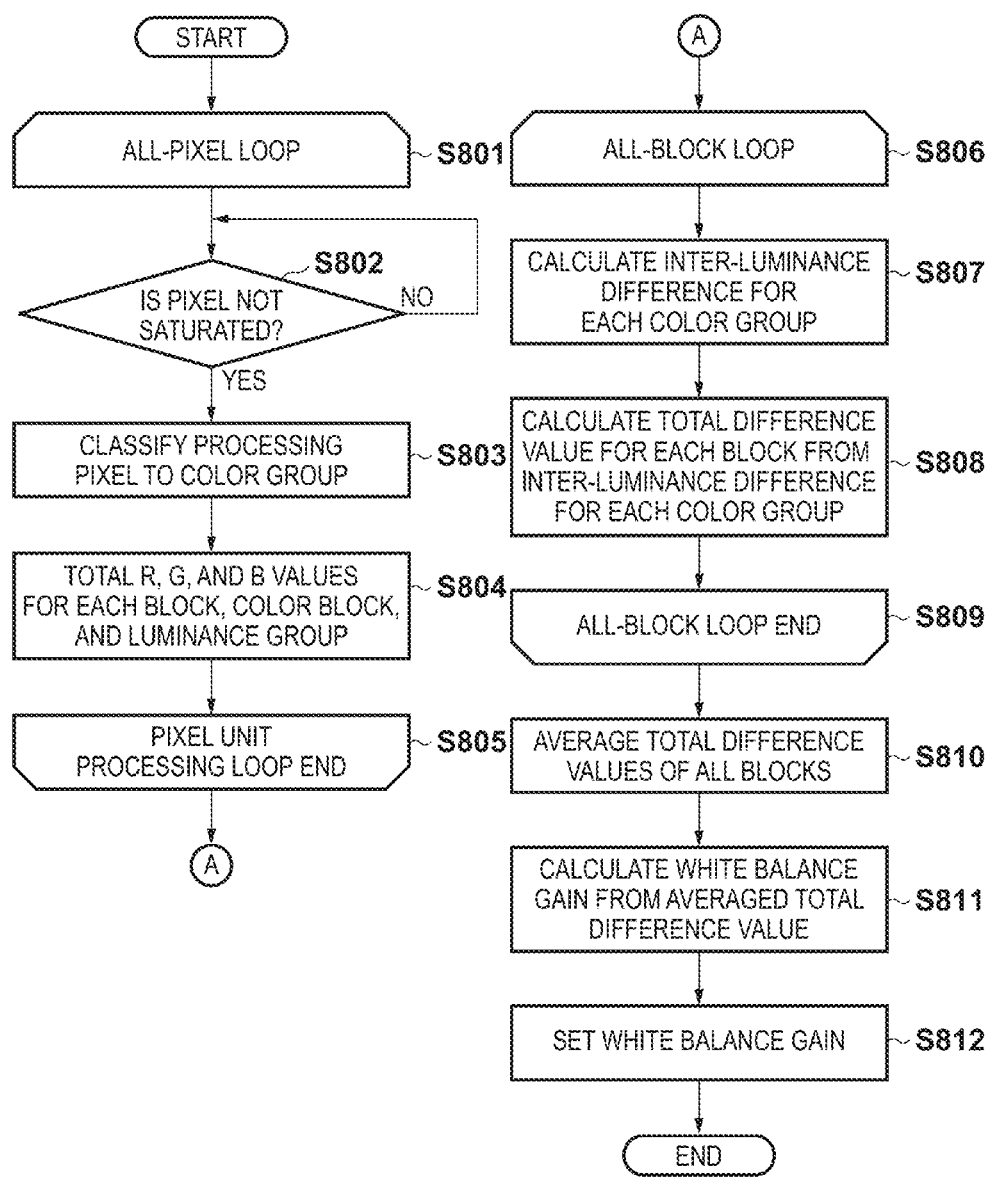
FIGS. 29A and 29B are flowcharts for explaining light source color estimation processing according to the eighth embodiment.

In FIG. 29A, steps S801 and S805 indicate that processes of steps S802 to S804 are executed for all pixels while raster-scanning a target pixel.

As in step S302 of the seventh embodiment, the system controller 50 confirms in step S802 if a processing target pixel is not saturated. If the system controller 50 judges that the pixel is saturated, it selects the next pixel as a processing target pixel, and confirms saturation. If the system controller 50 judges that the pixel is not saturated, the process advances to step S803.

In step S803, the system controller 50 classifies the processing target pixel to a color group. The color group determination processing of the processing target pixel is the same as that in the seventh embodiment, and the system controller 50 determines to which of six color groups shown in FIG. 26 the processing target pixel belongs.

In step S804, the system controller 50 integrates RGB values of the processing target pixel in correspondence with a block, color group, and luminance group to which the processing target pixel belongs. In this case, the block is obtained by dividing an input image into 4×4 regions, as denoted by reference numeral 400 in FIG. 25A as in the seventh embodiment. Also, assume that the luminance group is defined to have one of predetermined luminance ranges, that is, five ranges Y>235, 235≥Y>200, 200≥Y>150, 150≥Y>100, and 100≥Y. Note that the specification of the luminance group is an example, and the number of groups and upper and lower limit values of the luminance ranges corresponding to the respective groups are not limited to this example.

The system controller 50 assures, in advance, evaluation value memory areas in the system memory 126 in which pixel values (RGB) are integrated for each block, color group, and luminance group. FIG. 30 shows this memory configuration. Total values are obtained by adding pixel values for respective RGB components, and a count value indicates the number of pixels which belong to that block, color group, and luminance group.

In step S804, the system controller 50 determines a block, color group, and luminance group to which the processing target pixel belongs, and adds RGB components of the processing target pixel to the total RGB values of the corresponding class. Also, the system controller 50 increments a count value of the corresponding class by "1" at the time of addition.

Upon completion of counting of pixel values for all pixels of the input image by the processing until step S805, the system controller 50 calculates total difference values for each of 16 blocks in steps S806 to S809.

In step S807, the system controller 50 calculates differences between total values between two luminance groups for each color group. For example, the system controller 50 decides a luminance group of the highest luminance and that of the second highest luminance from those having count values not less than a predetermined value (200 in this embodiment) for each color group. In the example shown in FIG. 30, luminance groups having the numbers of pixels (count values) not less than 200 in color group 1 of block 1 are luminance groups 1 and 3. For this reason, the luminance group of the highest luminance is luminance group 1, and that of the second highest luminance is luminance group 3.

Next, the system controller 50 divides the total values by the count values of the two selected luminance groups to calculate average RGB values. In the example of block 1 and color group 1 in FIG. 30, the system controller 50 calculates average RGB values y1_aveR, y1_aveG, and y1_aveB of luminance group 1, and average RGB values y3_aveR, y3_aveG, and y3_aveB of luminance group 3. Furthermore, the system controller 50 calculates difference values color 1: subR, subG, and subB for respective components of the average RGB values of luminance groups 1 and 3.

Likewise, for color group 2 of block 1, the system controller 50 calculates difference values color 2: subR, subG, and subB of average RGB values of luminance groups 1 and 2.

In this manner, in step S807, the system controller 50 calculates differences color XX: subR, subG, and subB of total values of pixel values between a luminance group of the highest luminance and that of the second highest luminance for each color group of each block. XX is a color group number, and assumes a value ranging from 1 to 6 in this embodiment.

In step S808, the system controller 50 calculates average values of difference values color XX: subR, subG, and subB between two luminance groups calculated in step S807 for each block. At this time, the system controller 50 calculates weighted average values by applying larger weights as the total numbers of pixels (totals of count values) used in difference value calculations are larger in place of simply averaging six difference values.

That is, the system controller 50 calculates weighted average values by applying a larger weight to difference values of a color group having the larger total number of pixels (total of count values) which belong to a luminance group of the highest luminance and that of the second highest luminance. In the example of block 1 shown in FIG. 30, large weights are set for color groups 1 and 2, and small weights are set for color groups 3 and 6. Also, the system controller 50 records the weighted average values of difference values between the luminance groups as total difference values BlockSub_R, BlockSub_G, and BlockSub_B of each block.

After the calculations of the total difference values BlockSub_R, BlockSub_G, and BlockSub_B in step S807 are executed for all the 16 blocks, the system controller 50 advances the process to step S810.

In step S810, the system controller 50 calculates average total difference values aveR, aveG, and aveB as average values of the total difference values calculated for the 16 blocks.

In step S811, the system controller 50 calculates white balance gains from the average total difference values aveR, aveG, and aveB. In this step, if a G white balance gain G Gain assumes a predetermined fixed value, R and B white balance gains R Gain and B Gain are respectively calculated by:

$R\ \text{Gain}=(\text{ave}G/\text{ave}R)*G\ \text{Gain}$ $B\ \text{Gain}=(\text{ave}G/\text{ave}B)*G\ \text{Gain}$ In step S812, the system controller 50 sets the calculated white balance gains in the WB amplifier 201. The WB amplifier 201 executes amplifying processing of input RGB values based on the set white balance gains.

As described above, according to this embodiment, after input pixels are classified into a plurality of color groups, they are classified into a plurality of luminance groups in each color group, and a light source color is estimated based on differences between pixel values having luminance differences, which differences are calculated for each color group.

With this arrangement, a light source color can be estimated from differences between pixels having similar colors (belonging to an identical color group) and luminance differences (belonging to different luminance groups). For this reason, differences between two pixels of specular and diffuse reflection components for an identical object and identical color can be acquired at a high probability, and as a result, extraction accuracy of specular reflection components (=light source components), that is, estimation accuracy of the light source color can be enhanced.

Note that in this embodiment, weighted average values calculated by weighting the total difference values calculated for each group according to count values are used as total difference values of each block. However, total difference values of each block may be calculated by other methods. For example, as in the seventh embodiment, the luminance difference values of a color group with the largest count value may be used as total difference values of each block.

The total difference values of each block may be decided according to luminance distributions for respective color groups. A calculation example of total difference values based on luminance distributions will be described below with reference to FIG. 31. FIG. 31 shows an example of luminance distributions for respective color groups in a certain block. FIG. 31 shows count values for respective luminance groups.

For example, a specular reflection pixel has a high luminance value. Hence, upon calculating total difference values, weighted average values can be calculated by applying larger weights as the number of high-luminance pixels (for example, a luminance value 200 in case of 8 bits) is larger. Alternatively, luminance difference values of a color group having the largest number of high-luminance pixels may be used as total difference values. In this case, in the example shown in FIG. 31, luminance difference values themselves of color group 2 having the largest number of high-luminance pixels or weighted average values obtained by applying a large weight to the luminance difference values of color group 2 are used as total difference values of that block.

Also, total difference values may be calculated according to distribution degrees of luminance values. For example, luminance difference values of a color group corresponding to the largest number of luminance groups each having the number of pixels not less than a threshold may be used as total difference values. In the example of FIG. 31, a dotted line in each graph indicates the threshold of the number of pixels. A color group in which the number of luminance groups which exceed this threshold is largest is color group 1, and luminance difference values calculated for color group 1 are used as total difference values. Note that when there are a plurality of color groups in which the number of luminance groups which exceeds the threshold is largest, for example, average values of luminance difference values calculated for these color groups may be used as total difference values.

In this way, by considering luminance distributions upon calculations of total difference values from luminance difference values for respective color groups, the total difference values which reflect specular reflection components more can be generated.

This embodiment has explained the method of calculating differences between a luminance group of the highest luminance and that of the second highest luminance as luminance difference values. However, other methods may be used. For example, luminance difference values may be calculated from a luminance group of the highest luminance and that of the lowest luminance of those in which the number of pixels exceeds the threshold. Alternatively, luminance difference values may be calculated from a luminance group of the highest luminance and that having the largest number of pixels.

In this manner, difference values between pixels which reflect an object color of an object (the number of pixels tends to be large) and pixels which reflect the object color+light source color (luminance values tend to be high) can be extracted more accurately.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-142477, filed Jun. 25, 2012, No. 2012-142476, filed Jun. 25, 2012, and No. 2012-141463, filed Jun. 22, 2012, which are hereby incorporated by reference herein in their entirety.

What is claimed is:

1. An image processing apparatus comprising:
a processor; and
a memory storing instructions that, when executed by the processor, cause the processor to function as:
 a first calculation unit configured to calculate pixel value differences between a pixel of interest and a plurality of adjacent pixels in an input image for each of the pixels in the input image, wherein the plurality of adjacent pixels are a plurality of pixels which are located at positions separated from the pixel of interest by a predetermined interval in different directions;
 a second calculation unit configured to calculate similarities between the pixel value differences calculated for the pixel of interest in the input image for each of the pixels in the input image;
 a third calculation unit configured to calculate a distribution of the pixel value differences based on the calculated similarities; and
 an estimation unit configured to estimate a color of a light source which illuminates an object in the input image based on the calculated distribution.

2. The apparatus according to claim 1, wherein the third calculation unit excludes a pixel, the calculated similarity of which is not more than a predetermined threshold, from calculation targets of the distribution of the pixel value differences.

3. The apparatus according to claim 1, wherein the third calculation unit excludes a pixel, a magnitude of the pixel value difference of which falls outside a predetermined threshold range, from the calculation targets of the distribution of the pixel value differences.

4. The apparatus according to claim 3, wherein the magnitude of the pixel value difference is an absolute value of a pixel value difference vector including pixel value differences for respective color components as components.

5. The apparatus according to claim 4, wherein the similarity is a degree of similarity between directions of the pixel value difference vectors.

6. The apparatus according to claim 4, wherein the distribution of the pixel value differences is a distribution of directions of the pixel value difference vectors.

7. The apparatus according to claim 6, wherein the estimation unit determines a peak position of the distribution of the directions of the pixel value difference vectors, and calculates color component values corresponding to the determined peak position.

8. The apparatus according to claim 1, wherein the predetermined directions are four directions including up, down, left, and right directions from the pixel of interest on an input image plane, and
 wherein the second calculation unit calculates similarities of pixel value differences between adjacent pixels in neighboring directions of the four directions.

9. The apparatus according to claim 1, wherein the instructions cause the processor to further function as a generation unit configured to generate a reduced image by reducing the input image,
 wherein the first calculation unit, the second calculation unit, the third calculation unit, and the estimation unit execute respective processes to use the reduced image as the input image.

10. The apparatus according to claim 1, wherein the instructions cause the processor to further function as a division unit configured to divide the input image into a plurality of blocks,
 wherein the first calculation unit, the second calculation unit, and the third calculation unit execute respective processes for each block, and
 wherein the estimation unit does not use a block in which a ratio of pixels excluded from the calculation targets of the distribution of the pixel value differences is not less than a predetermined threshold in estimation of the color of the light source.

11. A control method of an image processing apparatus, comprising:
 calculating pixel value differences between a pixel of interest and a plurality of adjacent pixels in an input image for each of the pixels in the input image, wherein the plurality of adjacent pixels are a plurality of pixels which are located at positions separated from the pixel of interest by a predetermined interval in different directions;
 calculating similarities between the pixel value differences calculated for the pixel of interest in the input image for each of the pixels in the input image;
 calculating a distribution of the pixel value differences based on the calculated similarities; and
 estimating a color of a light source which illuminates an object in the input image based on the calculated distribution.

12. A non-transitory computer-readable storage medium storing computer-executable instructions for controlling a computer to function as:
 a first calculation unit configured to calculate pixel value differences between a pixel of interest and a plurality of adjacent pixels in an input image for each of the pixels in the input image, wherein the plurality of adjacent pixels are a plurality of pixels which are located at positions separated from the pixel of interest by a redetermined interval in different directions;

a second calculation unit configured to calculate similarities between the pixel value differences calculated for the pixel of interest in the input image for each of the pixels in the input image;

a third calculation unit configured to calculate a distribution of the pixel value differences based on the calculated similarities; and an estimation unit configured to estimate a color of a light source which illuminates an object in the input image based on the calculated distribution.

* * * * *